Nov. 24, 1970　　　　G. O. K. SCHNEIDER　　　3,542,960
SYSTEM FOR SELECTING A FREE PATH THROUGH A MULTI-STAGE
SWITCHING MATRIX HAVING A PLURALITY OF PATHS BETWEEN
EACH INPUT AND EACH OUTPUT THEREOF
Filed Oct. 12, 1967　　　　　　　　　　　　14 Sheets-Sheet 14
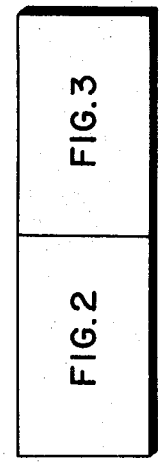
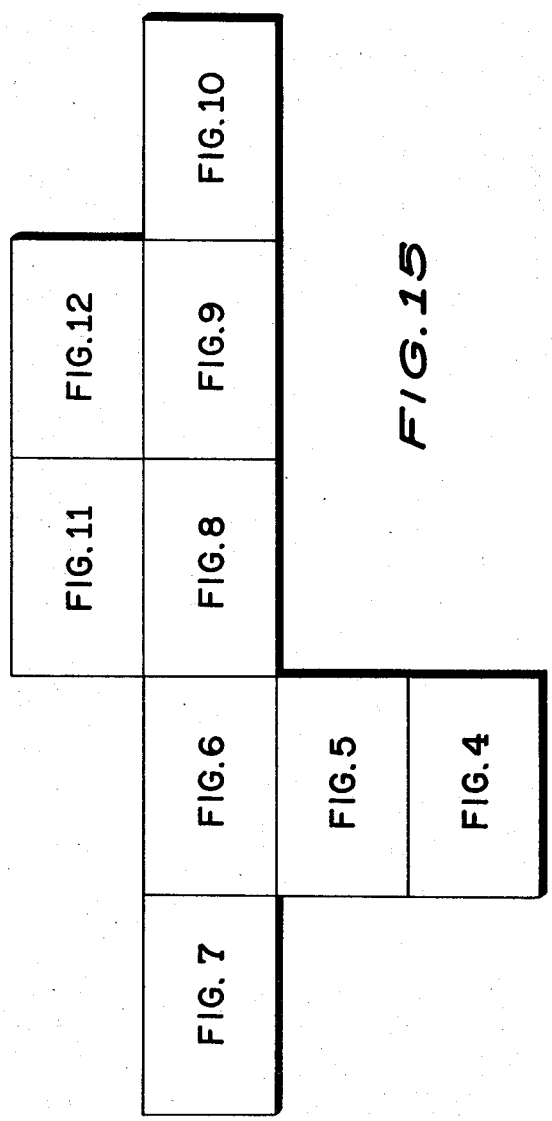

United States Patent Office 3,542,960
Patented Nov. 24, 1970

3,542,960
SYSTEM FOR SELECTING A FREE PATH
THROUGH A MULTI-STAGE SWITCH-
ING MATRIX HAVING A PLURALITY
OF PATHS BETWEEN EACH INPUT
AND EACH OUTPUT THEREOF
Gerhard O. K. Schneider, Rochester, N.Y., assignor to
Stromberg-Carlson Corporation, Rochester, N.Y., a
corporation of Delaware
Filed Oct. 12, 1967, Ser. No. 674,932
Int. Cl. H04q 3/42
U.S. Cl. 178—18                                 55 Claims

ABSTRACT OF THE DISCLOSURE

A path finding system for effecting selection and interconnection of electrical devices through a network of switching matrices providing plural paths between each input and each output thereof including scanning means for determining a free path to a selected output therefrom in a progressive manner through sequential stages and path check point devices for restricting path selection to the next stage whenever such stage requires another scanner for free paths thereafter. Also a re-entry function from an originating group of matrices to a second parallel group of matrices is provided upon failure to detect direct routes through the originating group. Due to the existence of plural paths from each stage to the marked terminating point of the matrix, the scanning and selection of paths in each stage is carried on to the exclusion of the other stages with final selection of a path in a given stage serving to initiate the scanning and selection in the subsequent stage.

BACKGROUND OF THE INVENTION

A telephone system has to cater to a number of simultaneous calls so that there must be a number of communication channels in parallel; however, the number of communication channels obviously need not be equal to the number of line circuits since not all or even a majority of subscribers will be using the system at the same time. Thus, the number of links through various selection stages between the subscriber lines and the common control, respectively, the route selecting stages, may be reduced. Thus, with the increase in the size of telephone system and the conversion thereof to automatic switching, there has been an increased use of line and trunk linking through concentrator stages between the subscriber equipment and the central part of the exchange. By use of concentrator stages between the subscriber equipment and the common control, the route selecting stages can be extended in such a way that a number of subscriber line circuits are remotely connected to a greatly smaller number of lines to a central exchange and also between the central exchange and a smaller number of outgoing trunk lines. The number of concentration and selection stages which are required in an exchange depends upon the system size and the established statistics relating to traffic at various times.

In the use of large cross-point switching matrices, for example through a concentrator network, one of the problems is to establish access to the various free links of the matrix in order to effect interconnection therethrough on a free path from a calling subscriber to a transmission bridge (junctor) and/or to a common control equipment (register, etc.), or between the transmission bridge (junctor or trunk circuit) and a terminating line circuit or outgoing trunk. There have been two basic systems proposed for effecting such path finding, which generally designates the determination of a free path through a combination of switching matrices. One of the methods for effecting such path finding is by way of multi-access control, accomplished by extending control leads into each of the stages of the link trunking, which may commonly have three stages, so as to provide for individual control on each of the separate links in the switching matrix. A second, and more preferred method, is the use of end-to-end selection which is accomplished by marking the inlet corresponding to a calling line and the outlets corresponding to the required trunk group or available common equipment. The same link trunking pattern is used in end-to-end marking as in the multi-access control; however, no individual control of the separate links in the switching arrangement is provided, thus the complexity and size of the marking equipment can be greatly reduced. The selection of an outlet may result in there being only one path back to the inlet; or, if more than one path from an inlet to a selected outlet is possible, means for effecting the marking at an intermediate stage of the link trunking pattern, rather than at the output thereof may be provided, as will be indicated more fully hereinafter.

The method of path selection used in a system has to be based upon the paths and links available from an inlet to a group of outlets and a means of determining whether such links are free. One of the ways of accomplishing such path selection is based upon the existence of wired mark paths to indicate whether a link is free or busy and whether or not a call has terminated. This function may be performed along the mark paths in conjunction with the associated sleeve leads which effect a holding of the cross-points at each stage of the network. In a previously developed path finding arrangement utilizing end-to-end marking, one end of the network, for example, the line circuit, is marked by a negative potential. This potential is allowed to spread via the mark leads (MK) in the direction toward the other end of the network where all of the outputs are marked with ground. Every mark lead of a link which is busy is broken, for example, by a guard relay actuated via the sleeve lead, and therefore the marking potential cannot extend through these busy links. At the other end of the network, only those outputs which display the marking signal represent a complete and free path through all switching stages to the originating point. A selector then scans the circuits in order and picks up the first free one which displays a marking signal. A low resistance ground is then applied to mark lead of the selected path which operates the relays of all the switching stages in series and the relays are then held by a second winding via the sleeve lead.

The known system described above is quite satisfactory in smaller switchboards; however, in large exchanges a difficulty arises from the fact that the marking potential applied at the input of the network has to be of sufficient magnitude to allow for some small, but finite, amount of current to be detected at the other end of the network. If the system is large, the number of all small circuits which make up the network will be sufficiently large that the current value of the applied marking potential required to produce the necessary detectable level of output current at the outlet of the network will be of sufficient magnitude to operate the relays at the originating end of the network where all the little currents concentrate to a current of large magnitude. This results in improper actuation of cross-points in links which may not be part of complete or free paths, in addition to the multiple actuation of cross-points on different paths in spite of the attempt to select but a single path through the network.

The major difficulty with this known system is that each of the outlets of the network are grounded at the same time so that the application of a marking potential to a single input of the network results in the spreading of a current through all of the free paths, simultaneously reducing the current detectable at each of the outputs in proportion to the number of links provided. In order to avoid the abovementioned difficulties, another known arrangement has been proposed for use especially with larger switchboard arrangements. In this known arrangement a negative marking potential, for example, is applied to one end of the network, such as a line circuit, as described previously. However, instead of providing ground simultaneously at each of the outputs of the network, a scanner is provided for selectively sequentially applying ground to each of the outputs of the network, so that at any one instant current flow through the network will be confined to but a single path. In this way, the magnitude of the applied marking current can be maintained at a sufficiently low value to avoid unintentional actuation of cross-points. If a circuit and all links between this circuit and the orginating point are free, a current will develop which is detected by a current detector in the scanner, resulting in a stopping of the scanner at the selected output. The scanner then applies a ground signal continuously, thus allowing all of the switching relays in series leading to the originating point to operate. All relays are then held again via the sleeve lead in the known manner.

The systems described above apply only to networks wherein but a single path exists between a terminating and an originating point. If multiple paths are available between a given input and a given output of the network, other arrangements obviously must be provided. One such arrangement is provided in copending application Ser. No. 580,785, filed Sept. 20, 1966, now Pat. No. 3,485,956, in the name of Adam A. Jorgensen et al., which application is assigned to the same assignee as the present application. The system disclosed in this copending application is applicable to switching networks wherein a unique path exists from an intermediate stage of the network in both directions to the input and outputs of the network even though more than one path exists through the network from a single input to a given output. In the scheme proposed therein, a scanner selectively and sequentially applies a transient marking signal of insufficient magnitude to operate the relays in the network to the intermediate points in the network so that the marking signals spread in both directions along the unique paths to the given input and output associated therewith. Magnetic cores are coupled to each of the links of the network to detect the passage of the marking signal and means are provided for detecting switching of a core between each of the stages of the network indicating that a free path exists in both directions to a marked input and a given marked output. Detection of this condition results in a stopping of the scanner and application of an actuating signal to the unique scan point to operate each of the relays along the free path to the marked input and marked output, which relays are then held in the known manner.

However, in systems having many switching stages from a given line circuit through a plurality of available junctors to a plurality of available registers, or other common equipment, wherein a plurality of paths exist in a combination so that no unique path can be determined from any point in the network through all stages thereof, none of the foregoing proposed path finding arrangements are applicable.

As indicated above, in switching systems using relay matrix networks, for purposes of reduction in complexity, size and cost of operation, it is desirable to mark both ends of the network which are to be connected and to select one path which is available to connect the ends through all stages of the network. In systems where multiple paths exist between a given input and a given output of the system, it may be necessary to effect path selection on a step-by-step basis, as proposed by the present invention. However, what is to be avoided by this method is a blocking situation whereby a path is selected through the initial stages of a network which accesses only to one or more succeeding stages which may be completely busy.

If all portions of each selection stage of a link network are available to all of the calling lines, the system is said to have full availability; whereas, if only some portions of the selection stages are avaliable to some of the lines, the system is said to have limited availability. Thus, calling lines in a limited availability system have access to all of the called lines but only through certain sections of the exchange. For example, a system has a limited availability if it does not allow calls to mature because a call has been directed into a section of the exchange which has only a limited number of paths to the required destination, all of which are in use at this time. There may be other sections of the exchange which cannot be reached, although they are capable of handling the call and are not fully occupied. Full availability, on the other hand, is provided when all of the available paths to a required destination are accessible from any starting point.

The limited or non-limited availability of a system depends upon the number of lines which are provided in the line link network and trunk link network interconnecting the calling and the called line circuits, respectively, with the exchange equipment and the trunking arrangement provided thereby. Obviously, non-blocking trunking provides the most desirable arrangement since this means that no calls can be lost because of insufficiency of switching equipment. One of the ways in which the system design is effected by use of non-blocking trunking wherein all of the possible paths through the switching system are available to all the inputs and outputs is by use of very large availabilities on the cross-point matrices.

An increase in the parallel lines, which additionally necessitates an increase in the amount of supervisory equipment available at the output of the switching network, however, is an unsatisfactory solution to the blocking problem since it greatly increases the complexity and cost of the system. What makes the solution even more uneconomical is the fact that while additional lines are provided in order to prevent a blocking situation from occurring during high traffic periods, even during these peak periods many portions of the switching network are unused, but they are unavailable to other portions of the system which may still be blocked.

One solution which has been proposed other than the provision of additional parallel paths is the use of a reentry function. This method provides for certain outlets at a stage in the network to connect back into inlets of a preceding stage of a parallel switching network so that alternate routing is available when all the direct first choice trunks are busy. However, prior arrangements relating to the re-entry function have required switches having a large number of outlets in order to permit the re-entry principle. As a result, while greater availability of all portions of the switching network is provided by use of such re-entry function, the requirement for switches having a large number of outlets to support this function conflicts with the economic considerations which prompt the use of the function in the first place.

It is the principal object of the present invention to provide a switching network and path finding arrangement which is free from the aforementioned problems relating to known systems.

BRIEF DESCRIPTION OF THE INVENTION

The present invention relates to a path finding arrangement for a concentrator network, in the form of a crosspoint switching network, for interconnecting one of a plurality of subscriber line circuits through one of a plurality of universal junctor circuits to a selected register or other common control device. The present invention has particular application to those cross-point switching networks wherein a plurality of paths exist through the network between a given input and a given output thereof.

Since it is impossible to determine a single free path through a network wherein a plurality of paths exist between each input and each output by end-to-end marking alone, the present invention proposes that in conjunction with end-to-end marking an individual stage scanning be provided on a step-by-step basis wherever necessary to select a single link from a multiplicity of links forming a part of the paths free and accessible to the marked input and output. The links in such stages are in this way selected sequentially with a holding mark being extended from one stage to the next as the path finding operation proceeds through the network. The controlled advance of the holding mark is made possible by isolation devices connected to each link of each stage and the progressive advance of the path is aided by restricting scanning at each stage to those links accessible to the selected link in the preceding stage.

More particularly, path finding is accomplished in accordance with the invention through the cross-point switching network, for example, a line link and a service link network by marking a selected input, i.e., a subscriber line circuit, with ground potential and sequentially applying a marking potential to available supervisory equipment of the desired type, for example, a register or dial pulse acceptor, until passage of a path finding current due to the marking potential from the selected supervisory device to the marked input is detected indicating at least one free path. The marking potential has to be applied as a pulse of a duration long enough to be detectable in the path scanner but not long enough to operate any relays in the path. As soon as a valid pulse has been detected, scanning is stopped and suitable relays are actuated to hold the selected supervisory device only while actuating a scanner associated with the next selector stage of the network. This scanner then scans all of the links of that selector stage associated with the selected supervisory device to the exclusion of the other links until a free path from that selector stage to the marked input of the network is detected, whereupon the scanner is stopped and a suitable relay associated with the particular selector stage is actuated to hold only the selected link therein and provide for connection of the selected supervisory device thereto while actuating a scanner in the next selector stage. This procedure is repeated in a step-by-step manner until a free junctor circuit is selected and a free link in each selection stage of the line link network forming part of a complete path with previously selected links and supervisory equipment is chosen and connected to form a complete path through the network. In this way, equipment selection can be effected along with path selection in a combined operation.

A particular feature of the present invention is the provision of a scanner in association with a group selector stage of the networks such that only one of the plurality of groups of switches in the selector stage associated with a previously selected link is scanned. In this way, once a free link associated with a free path is determined in any one selector stage, it is unnecessary to check backward to determine whether this link connects with the previously selected link. Thus, only a single current detector has to be provided so as to sense the transient pulse going forward along the marked line circuit on whatever link is being scanned at a given time, without need for a second current detector to check backward for the previously selected link.

Another very advantageous feature of the present invention resides in the provision of means along each marked path for preventing passage of the prolonged D-C current applied for actuating a switching relay in any one selector stage from passing through to the next selector stage, which may have more than one link forming part of a free path to the marked line circuit, and inadvertently actuating relays therein. In accordance with the present invention one such means is the provision of a capacitor in the mark lead (MK) associated with a path checkpoint device situated between each selector stage, which path checkpoint device not only prevents the application of the prolonged D-C current forward to the next selector stage but also serves as a means for providing a holding potential for the previously selected links and supervisory devices. In addition, in accordance with the invention, suitable diodes and choke coils are provided in the mark path to regulate the passage of the prolonged D-C actuating current while allowing passage of the transient check pulses.

An additional feature of the present invention is the provision of a re-entry operation which makes possible a greater availability of the parallel paths through the network thus increasing the traffic carrying capabilities of the links. For the connection of a junctor to a terminating line or trunk circuit one or more selector stages in series are provided between the junctor and the terminating line or trunk circuit. The first switching network of the first selector stage connected to the junctor offers a choice of a predetermined number of links to prescribed ones of the switching networks which make up the second selector stage. The output of these selected ones in the second selector stage connected to the first switching network in the first selector stage are in turn connected to certain ones of the switching networks in the third selector stage and so forth. However, the first selector stage of the network may include one or more additional groups of switching networks which do not interconnect with switching networks in the second selector stage available from another group in the first stage. In other words, the network may consist of two or more parallel channels of switching networks, with access between channels not provided except by re-entry. Thus, a path from an output of the first switching network of the first selector group may not be connected to available switching networks in the second selector group normally available only to switching networks other than the first switching network in the first selector group unless a re-entry link is provided. The re-entry link in accordance with the present invention is inserted in such a way that an extra outlet is added to each switching network in the second selector stage so that if each of the other outputs of the switching network are blocked, i.e. do not find a free path through the following selector stages, access to the re-entry link will provide connection from the first network channel in the second selector stage to the network of a second or subsequent parallel network channels in the first selector stage making available many additional paths through the switching network to a terminating line or trunk circuit. In this way, substantially full availability of the switching network can be provided. In accordance with the present invention, scanning is provided at each of the selector stages in such a way that the direct paths or links are checked first for possible availability for a certain call, and only if none of the direct paths is available after a second scanning of the direct paths or links will the re-entry feature be considered.

An additional feature of the re-entry function provided in accordance with the present invention is the provision of a control arrangement for preventing a circuitous connection of links, which might be termed "ring-around-the-rosey." In other words, an arrangement must be provided which will prevent repeated re-entries by selectively interrogating only one network channel at a time, inhibiting interrogation of the following or previously interrogated channels to prevent a complete connection through the re-entry circuits back to the first switching network without determining whether an available path can be obtained from one or more of the switching networks.

In accordance with the present invention the re-entry function provided in the system is coordinated with the overall path finding arrangement to reduce the complexity which normally was associated with the use of this re-entry function in known arrangements. By controlling the use of the re-entry function through individual stage scanning of available paths at the first selector group of a network, such as the trunk link network, the need for switches having a large number of outlets is avoided and only an additional outlet on each of the switching networks of this first selector group in the trunk link network need be provided.

It is a principal object of the present invention to provide a path finding arrangement of the type described wherein the difficulties and disadvantages inherent in known arrangements of a similar type are avoided or entirely eliminated.

It is another object of the present invention to provide a path finding arrangement for use in connection with cross-point link arrangements which make possible end-to-end marking where a plurality of paths exist between the inlet and the outlet of the system.

It is a further object of the present invention to provide a path finding arrangement of the type described wherein determination of a single free path through the switching network is accomplished by relatively simple and economic means.

It is still another object of the present invention to provide a path finding arrangement for use in connection with cross-point switching arrangements which makes available economical use of the re-entry function to provide for increased availability of existing lines or paths.

It is still another object of the present invention to provide a path finding arrangement of the type described which includes the provision of the re-entry function while preventing unauthorized excessive re-entry through a succession of switching matrices in a given selector group.

It is a further object of the present invention to provide a path finding arrangement wherein end-to-end marking is supplemented by selective control of successive switching stages in connection with a single current detector.

It is another object of the present invention to provide a path finding arrangement of the type described wherein means are provided to successively check each path for available links from one end of the network to the other.

It is still a further object of the present invention to provide a path finder arrangement of the type described wherein means are provided in connection with each switching stage to eliminate those paths not associated with previously selected switching links.

It is still another object of the present invention to provide a path finder arrangement of the type described which is applicable to large exchanges.

It is another object of the present invention to provide a path finding arrangement of the type described which prevents the unauthorized operation of inappropriate cross-points through elimination of the need for use of marking potentials of a magnitude sufficient to operate relays not associated with the desired path.

These and other objects, features and advantages of the present invention will become more apparent from the following detailed description of the invention, when taken in conjunction with the accompanying drawings, which illustrate one exemplary embodiment of the present invention and wherein.

Figure 2:
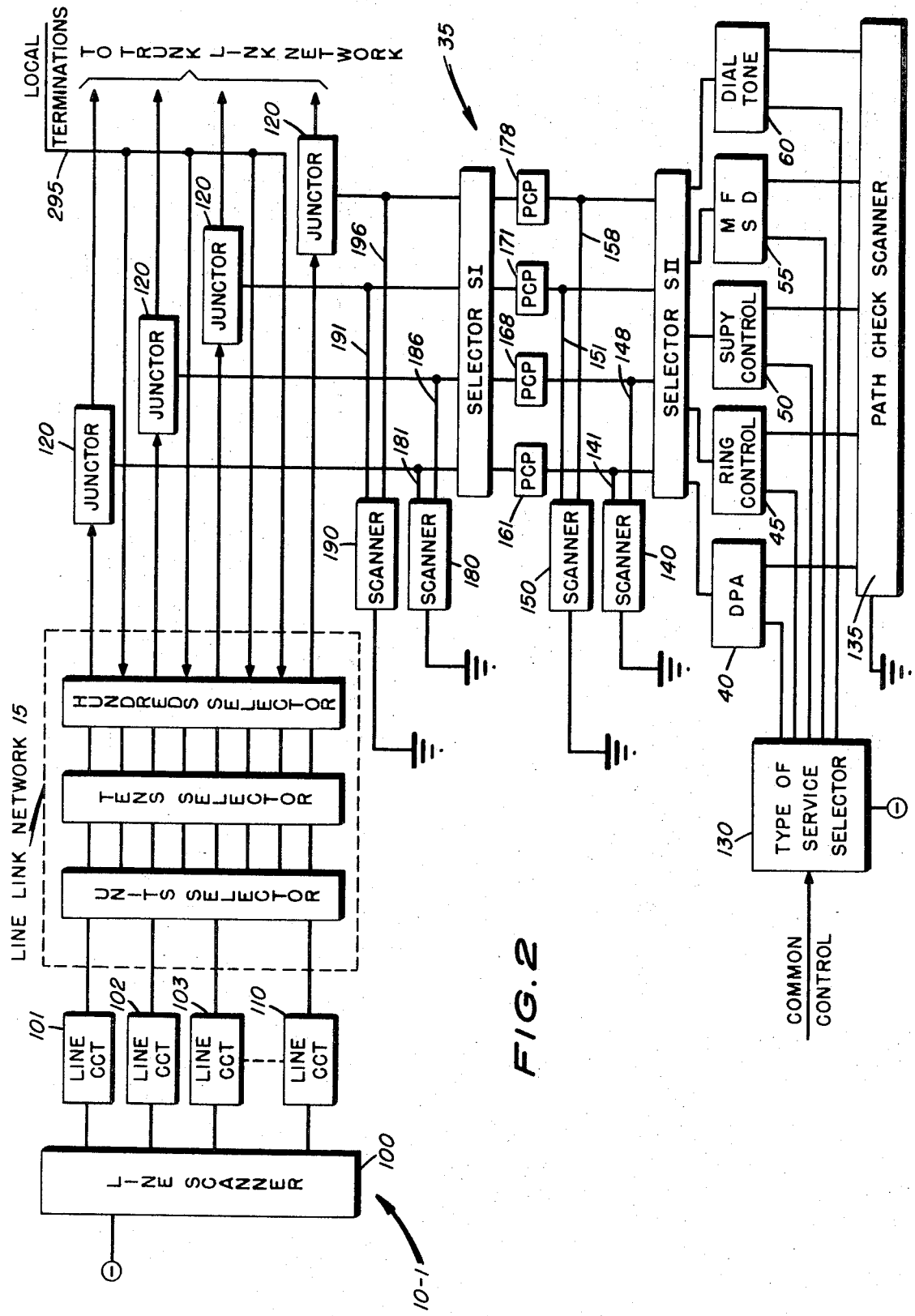
FIG. 2 is a schematic diagram illustrating in more detail the path finding arrangement in accordance with the present invention associated with the line link network and service link network of the system of FIG. 1.
Figure 3:
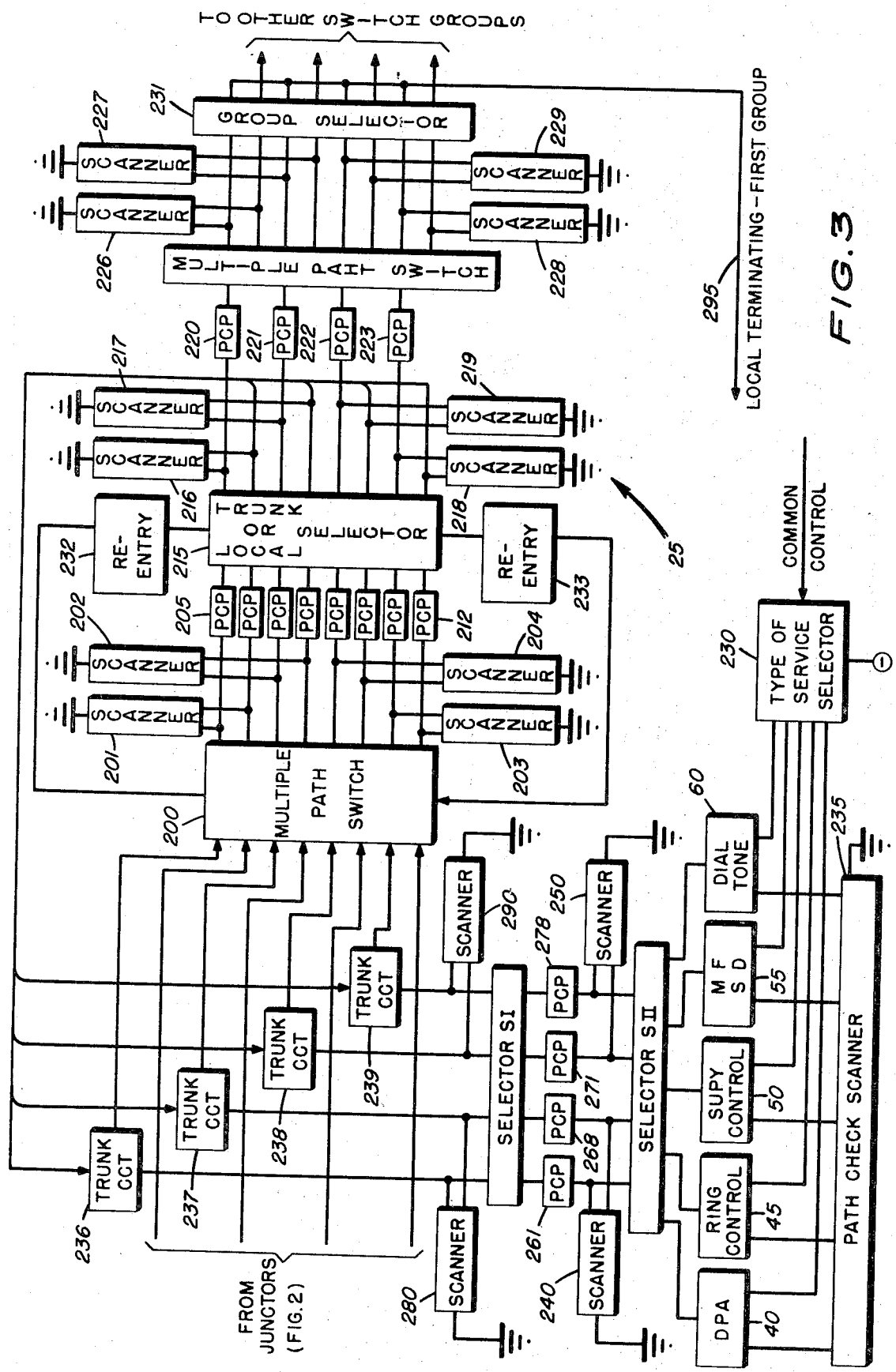
FIG. 3 is a more detailed illustration of the path finder arrangement of the present invention associated with the trunk link network of the system illustrated in FIG. 1.
Figure 4:
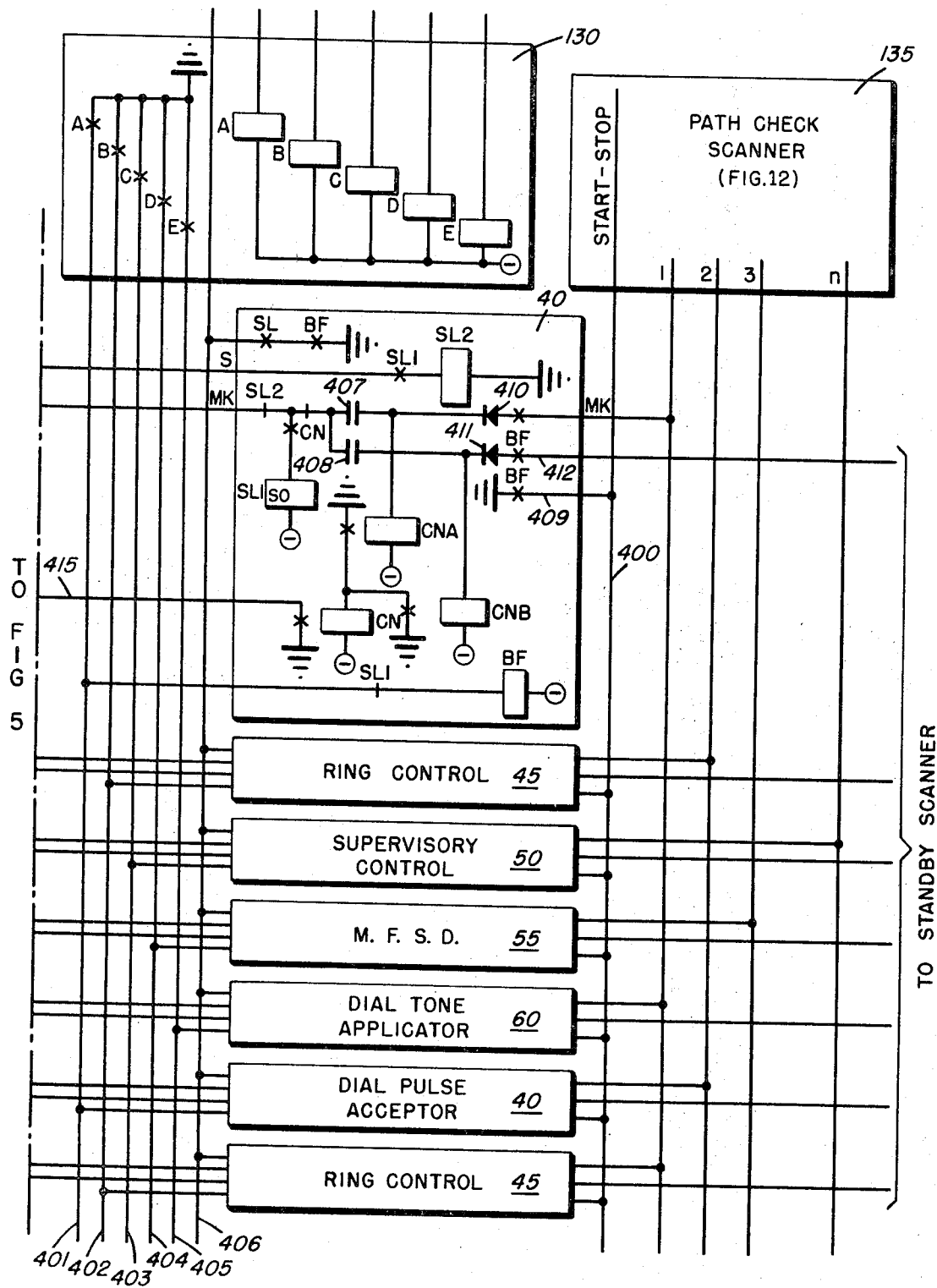
Figure 5:
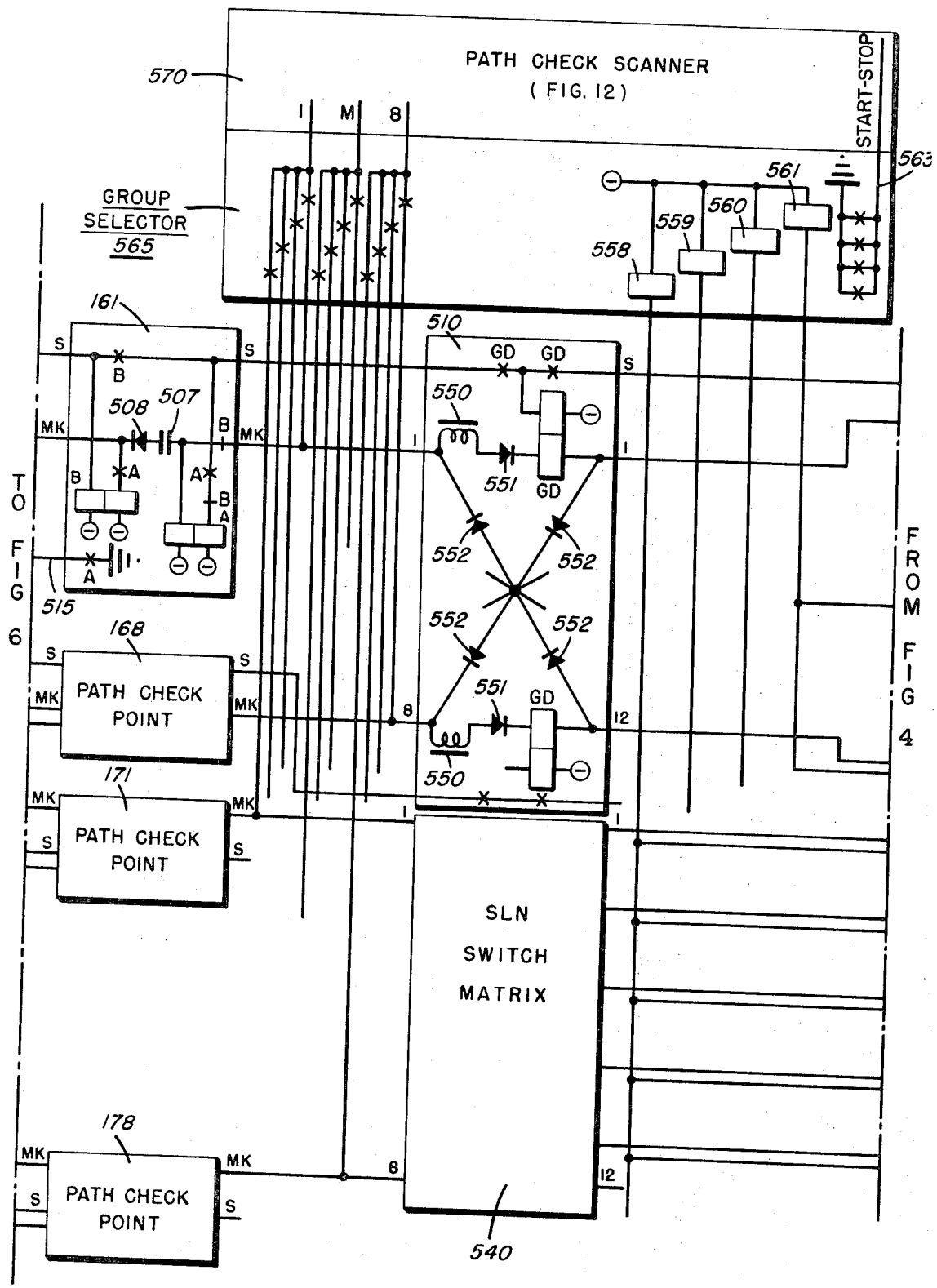
Figure 6:
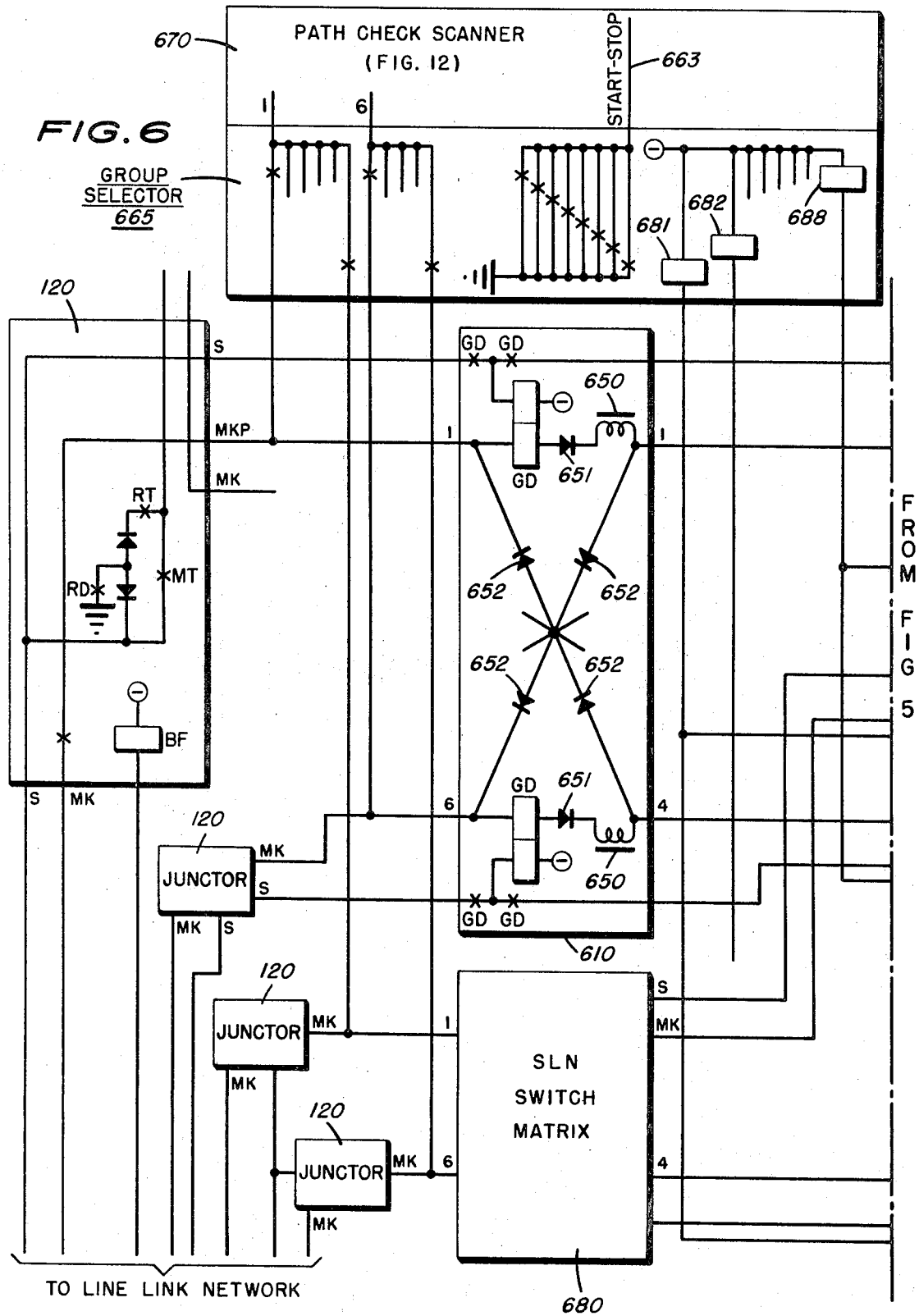
Figure 7:
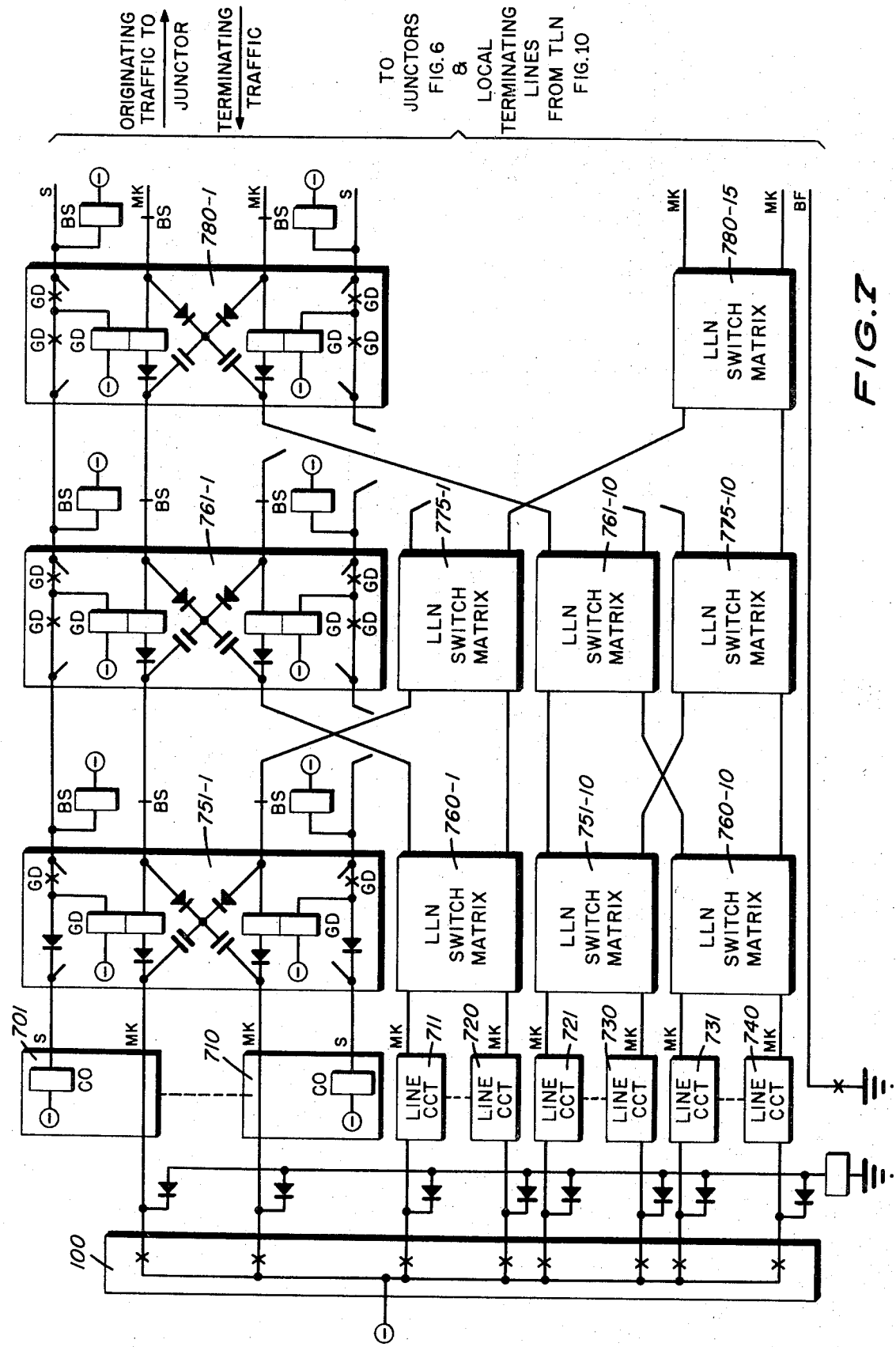
Figure 8:
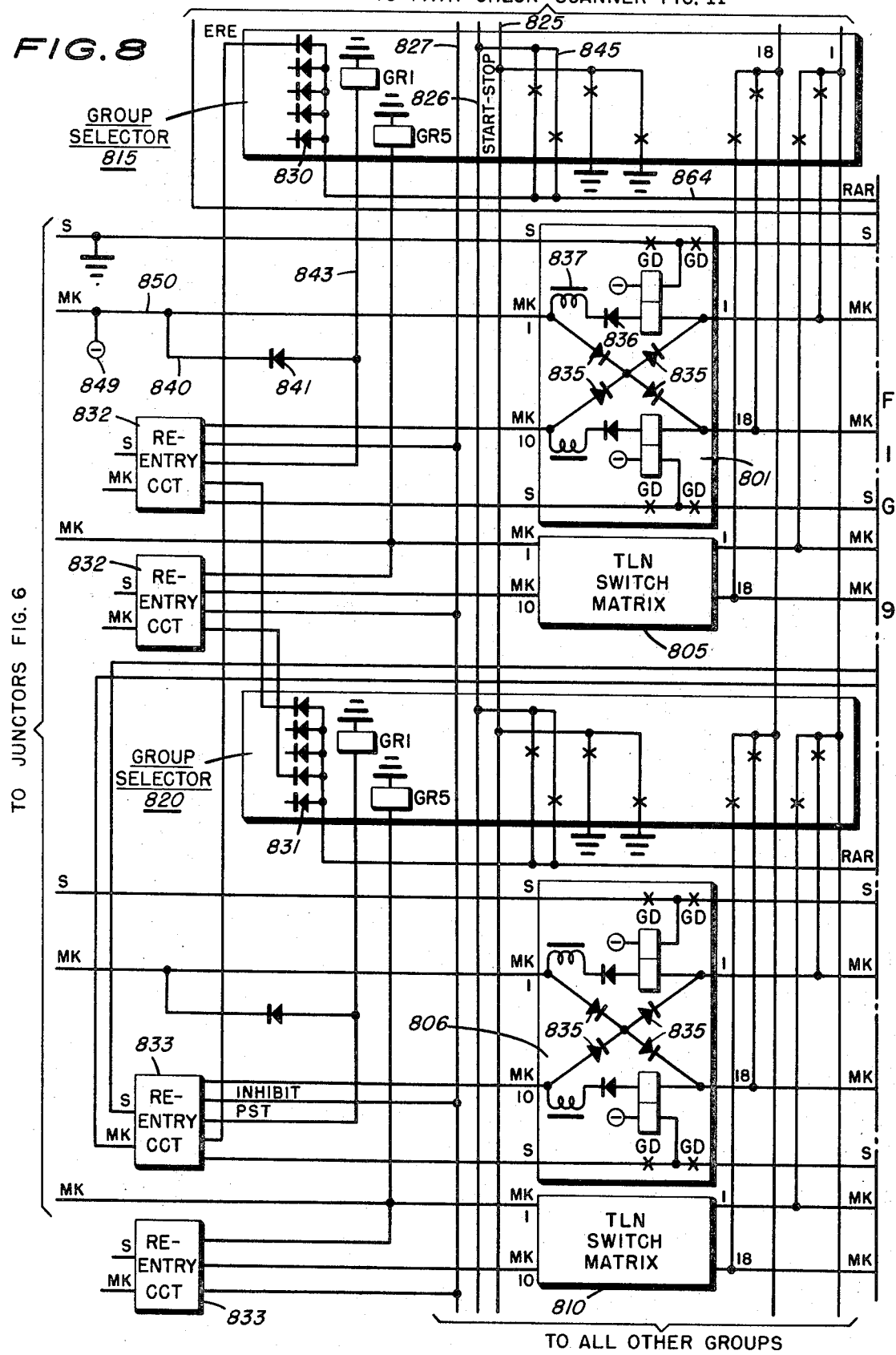
Figure 9:
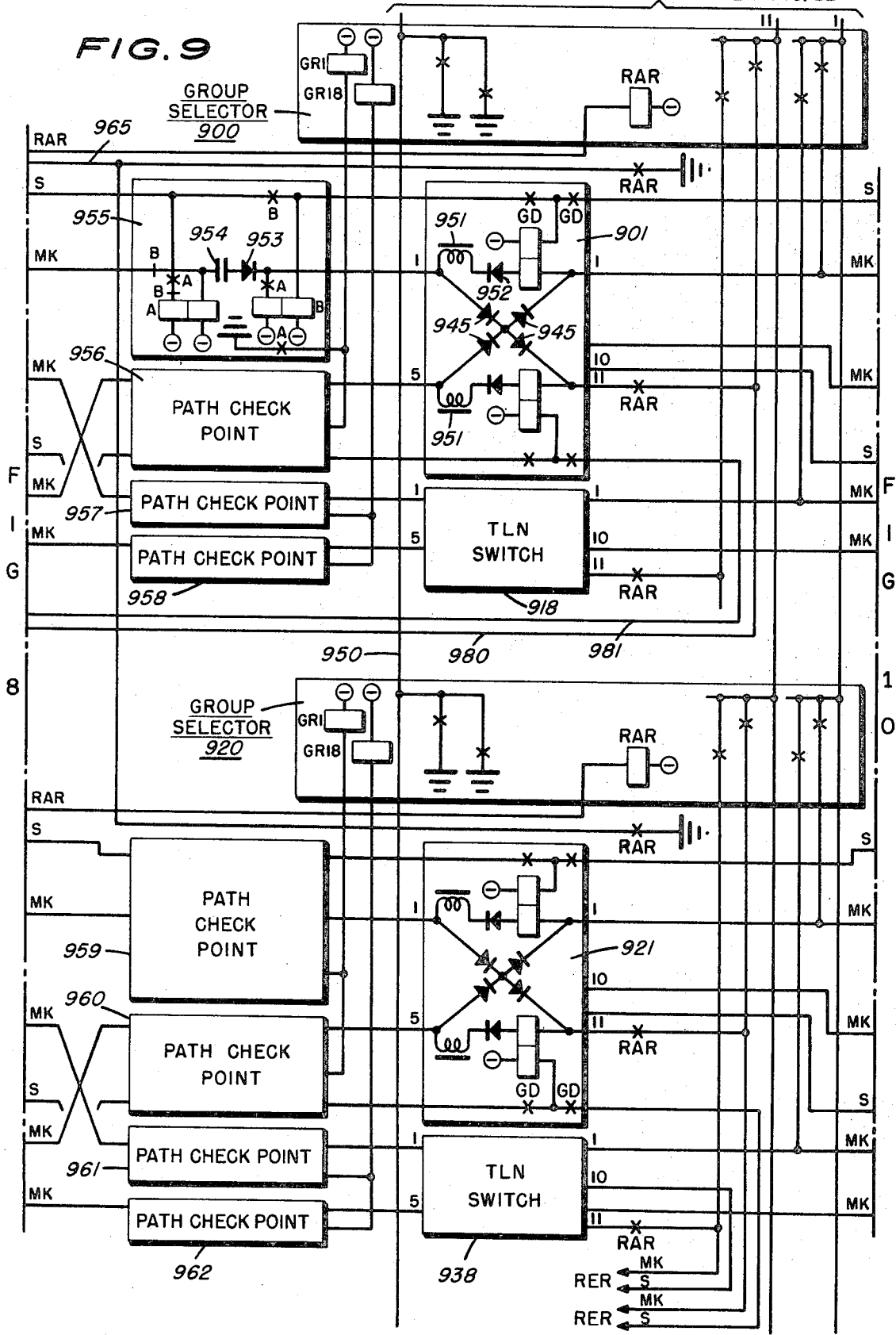
Figure 10:
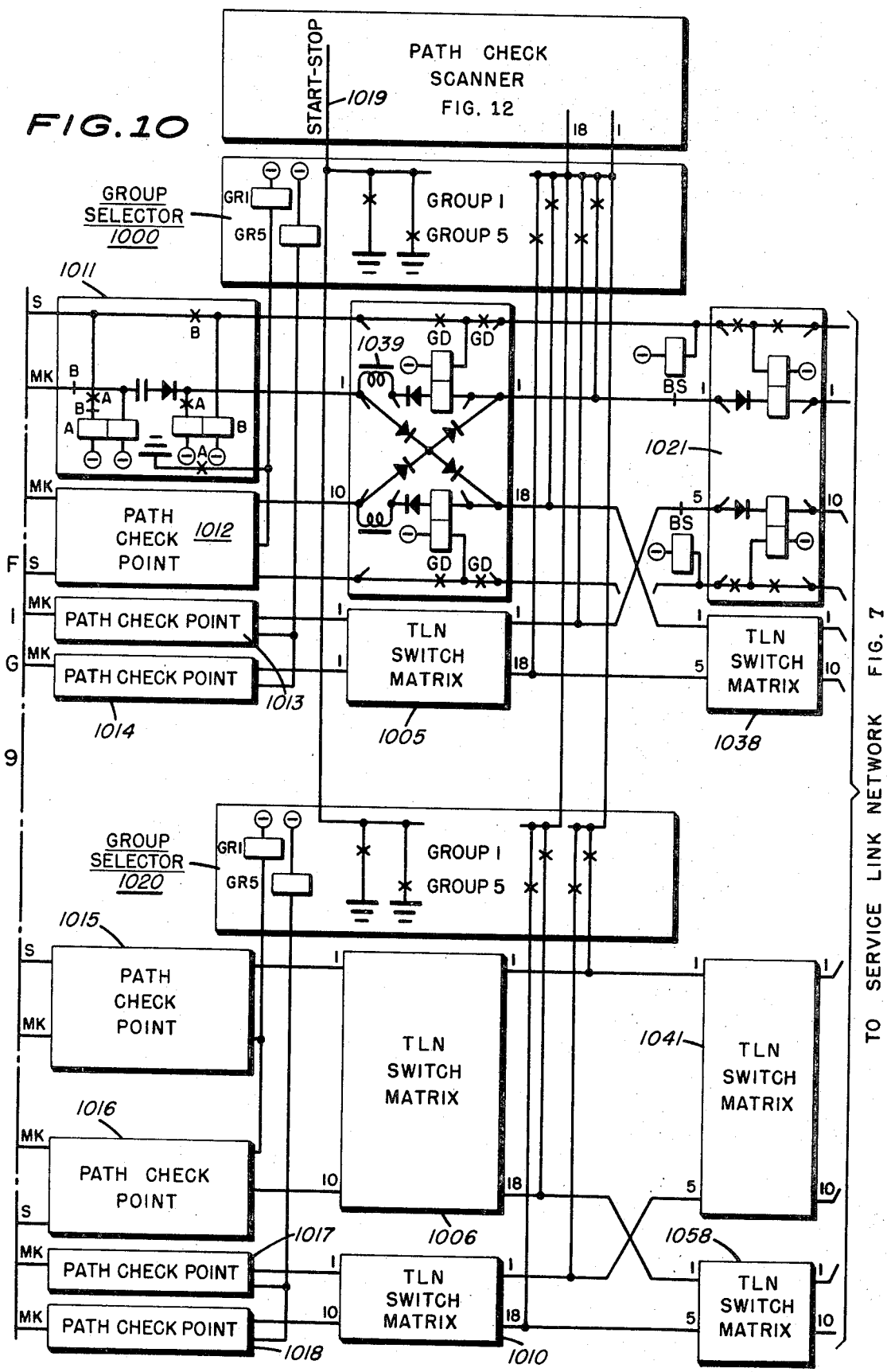
Figure 11:
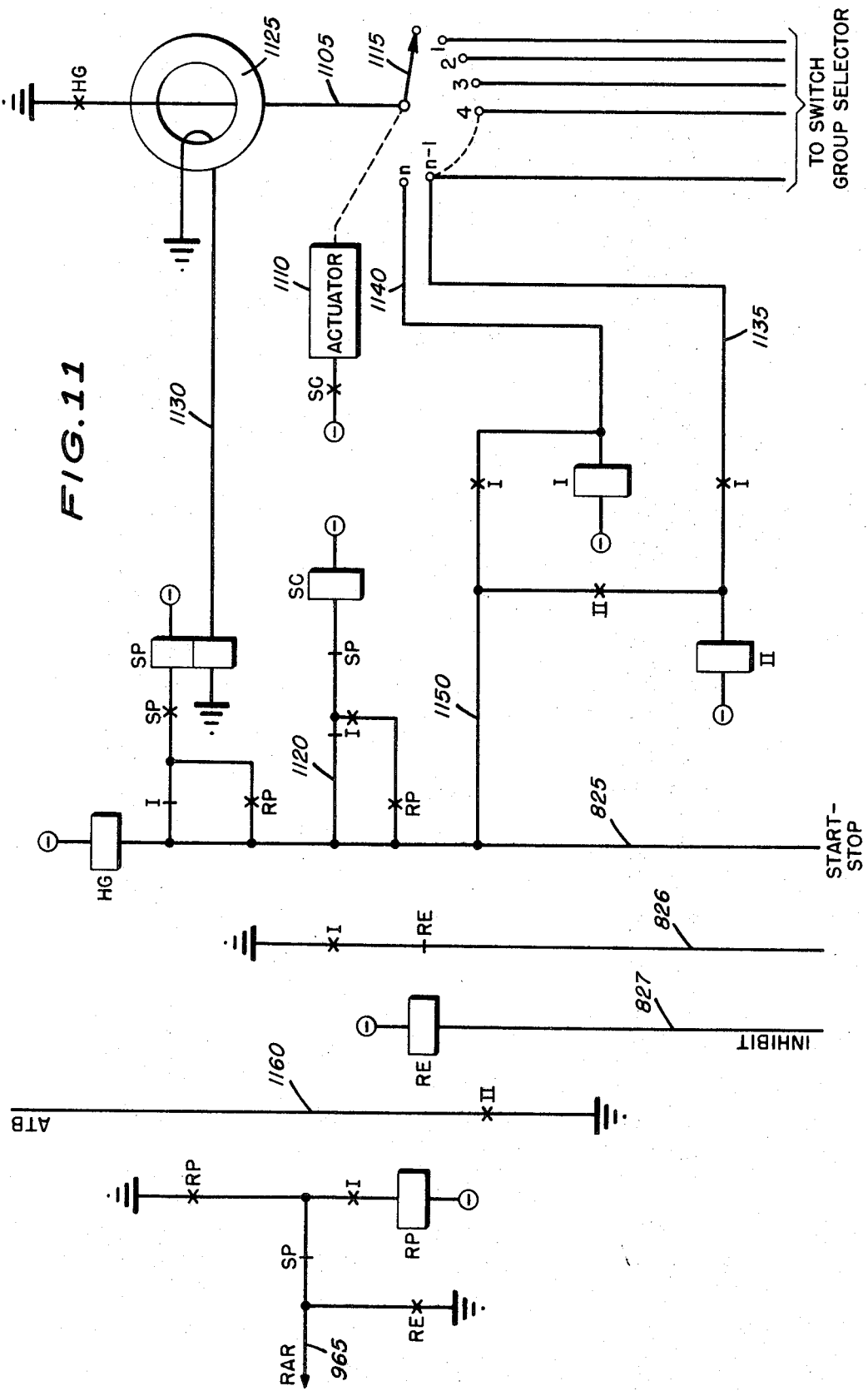
Figure 12:
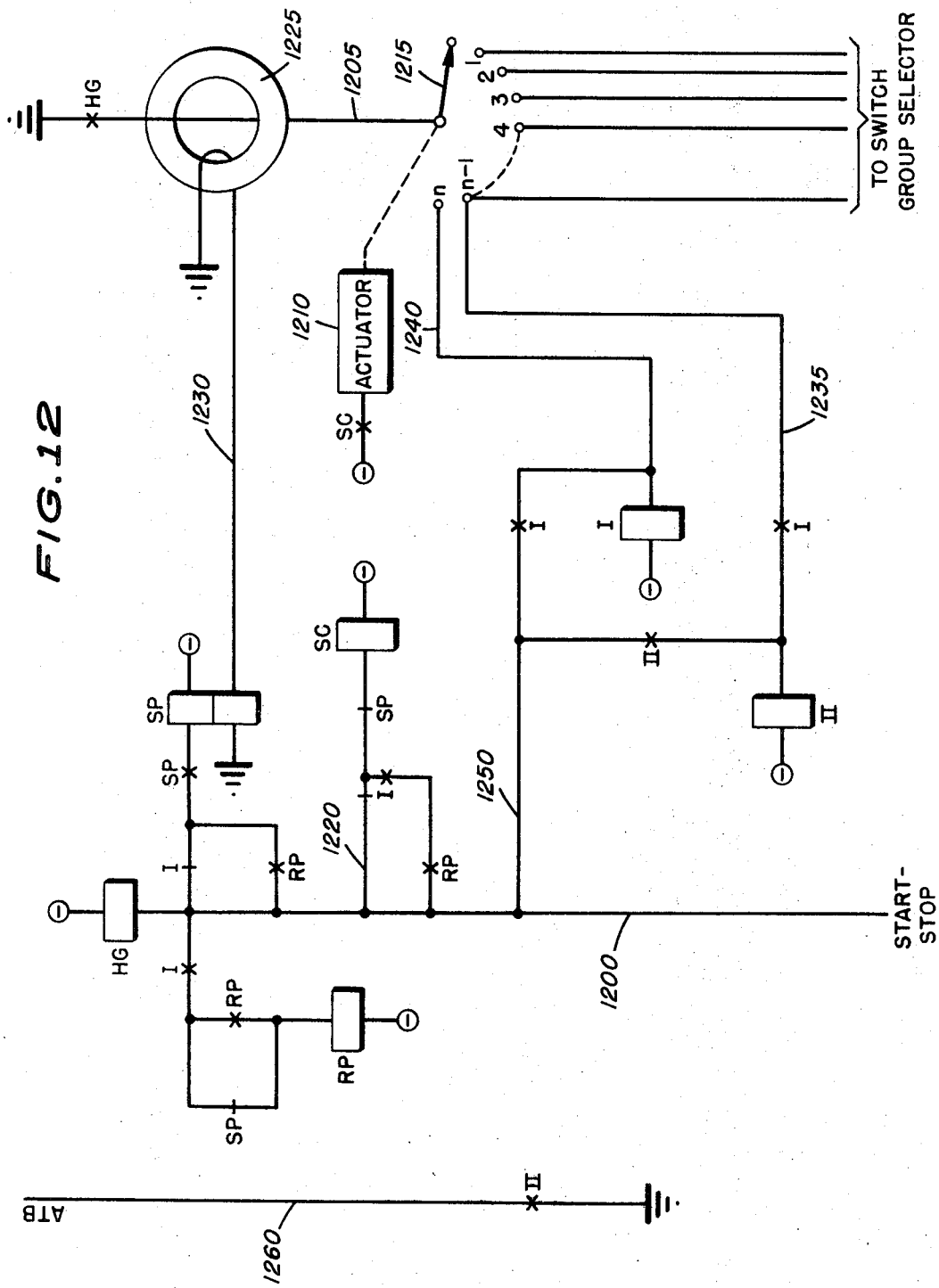
Figure 13:
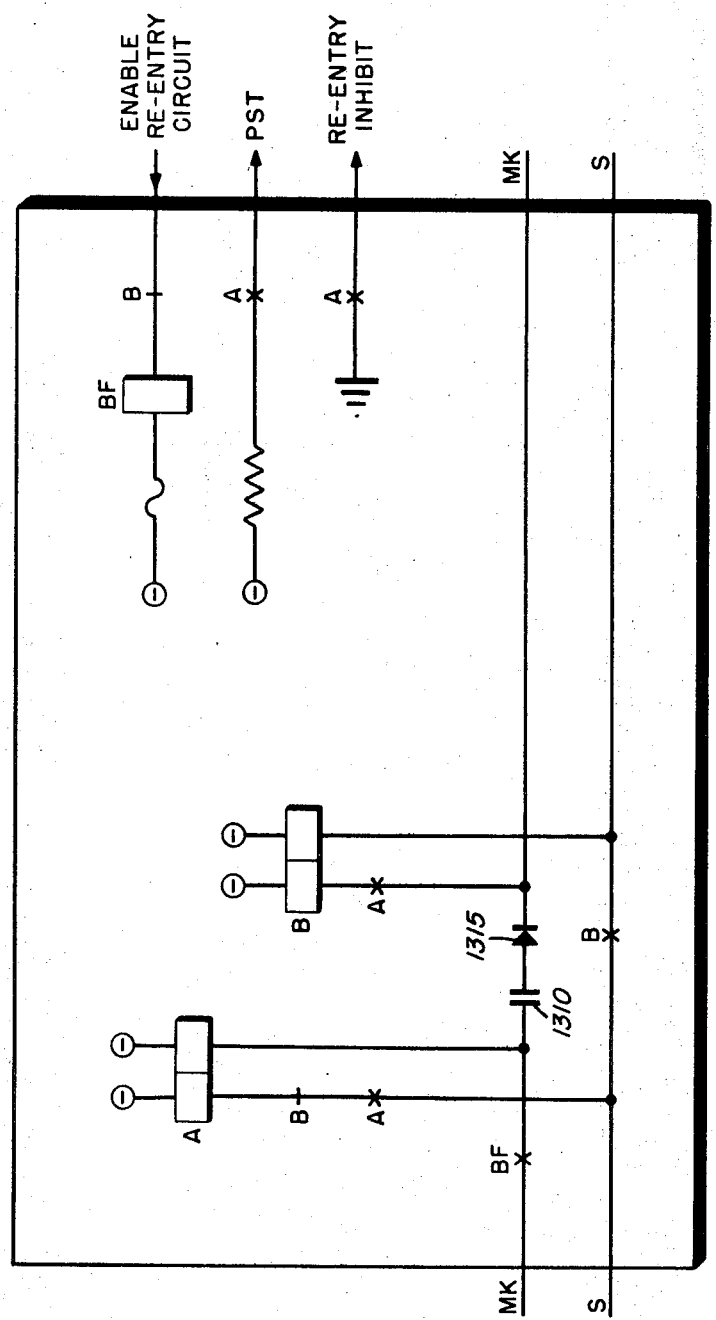

FIGS. 4, 5 and 6, combined, schematically illustrate the circuit arrangement of the service link network including the various selector stages thereof, the supervisory equipment available for connection to the line circuits through the switching arrangement, and the junctor circuits provided for supervisory control of the communication connection;

FIG. 7 is a schematic diagram of the circuit arrangement of the line link network interconnecting the junctors and the line circuits;

FIGS. 8, 9 and 10, combined, are a schematic circuit diagram of the trunk link network effecting interconnection of the junctors to outgoing trunks or to terminating lines in the line link network;

FIG. 11 is a detailed circiut diagram of the path check scanner associated with the first selector group of the trunk link network for control thereof;

FIG. 12 is a detailed circuit diagram of the path check scanner associated with the second selector group of the trunk link network for control thereof;

FIG. 13 is a detailed circuit diagram of the re-entry control circuit in accordance with the present invetnion as provided in the first selector stage of the trunk link network;

FIG. 14 is a diagram indicating the association of FIGS. 2 and 3 to form a complete system; and FIG. 15 is a schematic diagram indicating the association of FIGS. 4 through 12 to form a complete system.

DETAILED DESCRIPTION OF THE INVENTION

Figure 1:
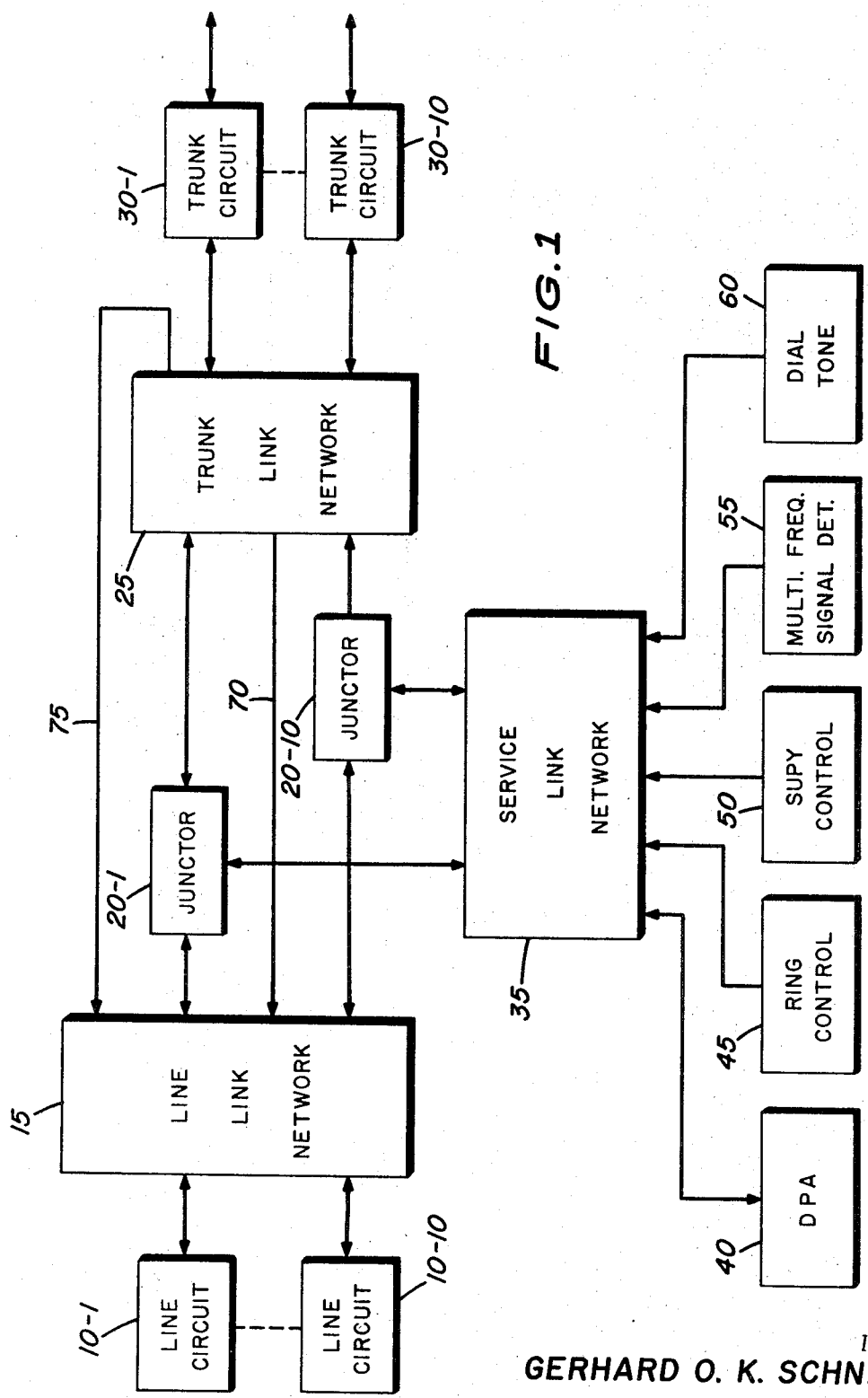
FIG. 1 is a basic block diagram of a telephone communication system of the type for which the present invention has been designed.

Looking to the drawings, and more particularly to the general block diagram of a telephone system illustrated in FIG. 1, a plurality of groups of line circuits 10–1 through 10–10, each consisting of a number of line circuits, are connected through a typical line link switching network 15, having a plurality of concentrator stages, to an available universal junctor in a respective group of universal junctors 20–1 through 20–10. These universal junctor circuits may be of the programmed type such as disclosed in U.S. application Ser. No. 552,283, of James Gordon Pearce et al., filed May 23, 1966, now U.S. Pat. No. 3,487,170, or of the non-programmed type such as disclosed in copending U.S. application Ser. No. 587,491, filed Oct. 18, 1966, in the name of William W. Pharis, both applications being assigned to the same assignee as the present application. However, it should be apparent from the following description of the invention that these junctor circuits may also take the form of known originating and terminating junctor circuits and that the network through which a path is to be found need not include a junctor circuit or similar device at all. Thus, the system of FIG. 1, which is shown in greater detail in the remaining figures, is disclosed only as an example of a system into which the features of the invention may be advantageously incorporated.

In order to establish a communication connection between line circuits through a universal junctor, the junctors are connected to a trunk link switching network 25 consisting of a plurality of relay matrix networks from which a communication line is either returned through the line link network 15 via line 75 to complete a local terminating call to a line circuit belonging to the same exchange to which the originating line circuit belongs, and also provides for connection from the junctors through various trunk circuits 30–1 thrugh 30–10 to other exchanges. Incoming trunk calls are also received via the trunk circuits 30–1 through 30–10 at the trunk link network 25 from which they are applied via line 70 through the line link network 15 to one of the plurality of line circuits of the groups 10–1 through 10–10.

For purposes of detecting requests for service and for performing other supervisory functions in connection with the establishment of a communication connection from an originating to a terminating line circuit or an outgoing trunk circuit, a plurality of supervisory circuits, such as a dial pulse acceptor or register 40, a ring control 45, a supervisory control 50, a multi-frequency signal detector 55 and a dial tone circuit 60, may be selectively connected under control of typical common control or register sender type equipment through a service link network 35, consisting of a plurality of relay matrix networks, one of the universal junctor circuits 20 and the line link network 15 to the communication line associated with the originating line circuit. At various stages in the establishment of a communication connection between originating and terminating line circuits and during subsequent monitoring of the line during the course of the communication, various ones of the supervisory systems 40 through 60 may be connected through an appropriate junctor to the originating or terminating line circuit or both. In addition, incoming trunk calls will also require the use of various supervisory circuits 40 through 60 for completion and monitoring of the communication line.

In order to make the line through line link network 15, trunk link network 25 and service link network 35 available on a traffic basis, a plurality of paths interconnect a given inlet and a selected outlet through each of these networks, thereby increasing the traffic carrying capabilities in the link networks with minimum links. However, in order to provide for connection between a given line circuit and one of the supervisory devices through an available junctor circuit, it is necessary to establish a free path through the service link network 35 and line link network 15 between the line circuit and the supervisory device. The most desirable method of establishing such a free path is by way of end-to-end marking wherein, for example, a potential is applied to the given line circuit and ground is applied to the selected supervisory system to be connected thereto. In the typical path finding arrangement using end-to-end marking wherein a unique path exists between each of the supervisory systems and a given line circuit, ground is applied successively to each of a plurality of the supervisory systems to be connected to the line circuit until an available supervisory system having a free path to that line circuit is detected by the passage of current therebetween. However, if a plurality of parallel paths exist through the service link network and line link network from a given supervisory system to a selected line circuit, some means in addition to the standard end-to-end marking must be provided for restricting the choice at each stage in the link networks to a single link through that stage to the selected line circuit. The same is true in connection with the completion of the communication connection between a junctor connected to an originating line circuit through the line link network and the requested terminating line circuit by way of the trunk link network.

In order to make the lines through the trunk link network 25 from the junctors 20–1 through 20–10 available on a traffic basis, a plurality of paths exist between each of these junctors and a given line circuit or trunk circuit. Once again, means must be provided in association with the trunk link network 25 for restricting the selection of the path through each stage of the trunk link network for determining a single path through to the terminating line circuit or trunk circuit. The present invention provides such a path finding arrangement.

Referring now to FIGS. 2 and 3, which when combined as indicated in FIG. 14 provides a detailed schematic diagram of the system illustrated in FIG. 1, and referring more particularly to FIG. 2, which illustrates schematically the features of the invention as applied to a portion of the telephone system extending from one of the groups of line circuits 10–1 through 10–10, as connected through the line link network 15, and through an available junctor 120 and service link network 35 to one of a plurality of supervisory devices 40 through 60.

The line link network 15 includes a plurality of concentrator stages which offer a unique path from each input thereof to each output. The outputs of the line link network are connected, on the one hand, to the universal junctors 120 for purposes of handling originating calls, and on the other hand, are connected to the local terminations from the trunk link network in the case of local terminating calls. While FIG. 2 indicates the presence of only ten line circuits 101 through 110 connected to the input of line link network 15, in practice, each group of line circuits 10–1 through 10–10, as illustrated in FIG. 1, will consist of many more line circuits, for example, one hundred line circuits, so that the line link network 15 performs a concentration of the line circuits with respect to the smaller number of junctor circuits in accordance with traffic requirements. Additional lines through the line link network 15 are then available for local termination of calls.

In contrast to the line link network 15, the service link network 35 provides a plurality of paths in excess of the number of inputs and outputs thereof so that end-to-end marking of this network will not determine a single path therethrough. In accordance with the present invention, path selection must be provided at each of the selector stages in the service link network to determine by use of end-to-end marking a single available path therethrough. In the arrangement illustrated by way of example in FIG. 2, the service link network 35 is provided with two selector stages SI and SII; however, this network obviously could be provided with more than just two selector stages, in which case a duplication of the path selecting equipment at each of the additional stages would be necessary.

Path selection is accomplished at each stage of the service link network by providing a scanner capable of sequentially marking the inputs provided at a given selector stage of the network until a free path from a marked input to the designated line circuit is detected by a current detector or other detecting device, which may be located in the scanner itself. At that point, actuation of the relay only in the particular link of the stage involved is accomplished while subsequent links, which may be more than one in number, are isolated by a path checkpoint device connected to each of the lines of the subsequent stage or stages. Selection is then shifted to the next stage, as will be indicated in greater detail below.

While FIG. 2 indicates the provision of only a single one of each of the various types of supervisory devices in association with the service link network 35, it should be understood that these devices are provided in number as necessitated by traffic requirements. Thus, several dial tone applicators 60, dial pulse acceptors 40, ring controls 45, etc., will be available for connection to various line circuits as required. In order to select an available one of the supervisory circuits for connection to a given line circuit for providing the service required, a type of service selector 130 is provided in association with each of the supervisory systems and is capable of scanning the plurality of systems of each type, as designated by the common control or register sender equipment, which may be any known type of register sender system, for connection through the service link network to the originating or terminating line circuit. Connected to all of the supervisory devices is a path check scanner 135 which scans the plurality of supervisory devices until a free device of the type selected by the type of service selector 130 is detected. This path check scanner 135 also serves as the end marking for the service link network 35 providing scanning of the links in the selector stage SII connected to the selected supervisory device to determine the first free link in the selector stage SII which forms part of a free path extending all the way to the marked line circuit.

As indicated above, since more paths through the service link network 35 exist than inputs and outputs thereof, path selection must also be provided at the input of selector stage SI of the service link network by means of scanner sections 140 and 150. In accordance with the present invention, as will be described in greater detail hereinafter, the scanners 140 and 150 are really provided as sections of a single scanner actuated from the selector stage SII by way of a group selector so that only one scanner section associated with the particular link selected in the selector stage SII by the path check scanner 135 will be energized. In this way, in determining a free path through the selector stage SII all of the links therein not associated with the supervisory device selected by the path check scanner 135 will be automatically eliminated from consideration. While only two scanner sections 140 and 150 are shown in connection with the input of the selector stage SI, it is of course understood that the number of scanner sections provided will depend upon the size of each of the selector stages in the service link network.

Since a selected link in the selector stage SII may connect to many links in the selector stage SI which form a path to a given line circuit, it is necessary to provide means at the input of the selector stage SI to prevent the energization of a link or links therein at the time that a selected link in the selector stage SII is energized during the course of the path finding operation. For this purpose, path checkpoint devices 161, 168, 171 and 178, are provided in series with each of the indicated inputs to the selector stage SI. Of course, many more inputs and outputs will be available at the selector stages of the service link network 35 than illustrated providing for many paths therethrough; however, only four such paths have been specifically illustrated to reduce the complexity of the drawing, thereby facilitating the description of the invention in association therewith. The path checkpoint devises isolate the selector stage SI from the selector stage SII during actuation of a link in the latter selector stage and also actuate the scanner 180 or 190 associated with the link selected in the selector stage SI as a result of the operation of scanner 140 or 150, respectively.

The trunk link network 25 consists of four stages in the exemplified embodiment, the first stage consisting of multiple path switch 200, the second stage consisting of a local or trunk selector 215, the third stage consisting of multiple path switch 225 and the fourth stage consisting of group selector 231, as indicated in FIG. 3. The output of junctors 120 are connected directly to the input of the multiple path switch 200 along with the outputs of other junctors associated with other groups of line circuits. The multiple path switch 200 provides a plurality of links from the input thereof to the second stage local or trunk selector 215 where the communication connection is extended either to an available outgoing trunk circuit or to the multiple path switch 225 in the third stage of the trunk link network for transmission to a terminating line circuit in the local exchange. A final stage of the trunk link network 25 consists of a group selector 231 which connects the path selected through the trunk link network to the proper group of line circuits through the line link network 15.

In accordance with the present invention determination must be made between each of the stages of the network restricting path selection and link actuation on an individual stage basis. A plurality of scanner sections 201, 202, 203 and 204 are connected to the output lines from the multiple path switch 200 which are connected through path checkpoint devices 205 through 212 to the input of local or trunk selector 215. The path checkpoint devices prevent link energizing signals applied to the links of the multiple path switch 200 from reaching the local or trunk selector 215 at the time of path selection in the first stage multiple path switch 200 and also energize the appropriate scanner 216, 217, 218 or 219, connected to the output lines of the local or trunk selector 215 to scan only those groups of output lines associated with the link selected in the first stage multiple path switch 200. The output line selected from the local or trunk selector 215 may be a line connected to one of a plurality of outgoing trunk circuits 236, 237, 238 or 239, or the outputs may be connected through a plurality of path checkpoint devices 220, 221, 222 or 223, to the third stage multiple path switch 225. Once again, the path checkpoint devices 220 through 223 isolate the multiple path switch 225 from energizing current applied to select a link through the local or trunk selector 215 at the time of path selection therein and also energize the appropriate scanner section 226, 227, 228 or 229, connected to the outputs of the multiple path switch 225 so as to scan only those inputs to the group selector switch 231 associated with the link selected in the multiple path switch 225.

Since a path from the group selector 231 through the line link network to a marked line circuit is a unique path, selection of a link in the group selector 231 will finally establish the remaining portion of the path to the marked line circuit. Therefore, no path checkpoint device is needed in the lines beyond the group selector 231. The outputs from this group selector 231 extend through the line link network 15 to each of the many groups of line circuits provided, such as the groups 10–1 through 10–10 illustrated in FIG. 1. Thus, for example, the lines 295 extending from the group selector 231 to the first group of line circuits will be connected directly into the third stage of the line link network 15 along a unique path to be marked line circuit. Local terminating lines to other switch groups via the line link network 15 are also provided at the output of the group selector 231.

In order to provide for substantially non-blocking trunking through the trunk link network 25, in accordance with the present invention, a re-entry feature is associated with this link network. A plurality of devices, such as re-entry devices 232 and 233, are connected via the second stage local or trunk selector 215 back to the input of the first stage multiple path switch 200. In this way, if the available links through the local or trunk selector 15 associated with the link selected in the multiple path switch 200 are occupied at the time of the path finding operation, a re-entry through one of the devices, such as re-entry devices 232 and 233, to the input of another group input of the multiple path switch 200 not associated with the group including the link already selected therein will make available additional links in the local or trunk selector 215 associated with this other group of links in the multiple path switch 200. Thus, substantially full avalability of the links in the local or trunk selector 215 is provided by the re-entry function, as will be described in greater detail hereinafter.

For purposes of making available to incoming trunk calls the supervisory devices necessary for supervisory control over and completion of the communication connection, an additional service link network identical to that associated with the junctors 120 is associated with the incoming trunk circuits 236 through 239. In the case where a line circuit is extended metallically through to an outgoing trunk circuit, the equipment necessary for supervision and control of certain functions may be provided at the distant exchange. In view of the speed which is necessary to prevent loss of dialed information, a full availability of the supervisory systems to the incoming trunk circuit requires a multiple path service link network associated specially with the trunk circuits. Once again, a type of service selector 230 under control of the common control register sender equipment selects the required supervisory circuit, such as the dial pulse acceptor 40, ring control 45, supervisory control 50, multi-frequency signal detector 55, or dial tone applicator 60, required for association with the communication connection. The path check scanner 235 scans the supervisory equipment in combinations until the coordinate effort of the path check scanner and the type of service selector results in the selection of an available supervisory system of the type required.

As in the service link network associated with the junctors 120, the network associated with the trunk circuits in the exemplary embodiment consists of two selector stages SI and SII with scanning of the links in each of the selector stages being provided by scanners 240, 250, 280 and 290. Again, in order to confine link energization to a single stage at a time, path checkpoint devices 261, 268, 271, and 278, are provided in the input lines to the selector stage SI for purposes of isolating this stage from the previous stage. While the supervisory systems associated with the service link network connected to the junctors 120 and the network associated with the incoming trunk circuits 236 through 239 are illustrated as each being provided with a separate group of supervisory devices 40 through 60, it should be apparent that the supervisory systems may be provided as common equipment to the two networks with the number of systems of each type depending upon the traffic requirements.

Before proceeding to a more detailed description of the circuit arrangement of the path finding system of the present invention, as set forth in FIGS. 4 through 15, a general description of the operation of the system as illustrated in FIGS. 2 and 3 will be first considered to provide a proper foundation for understanding the more detailed description to follow thereafter.

The line scanner 100 continuously scans the group of line circuits connected thereto and upon detection of a request for service from a given line circuit in the form of an off-hook condition marks this line circuit, and in the known manner provides indication to the register sender equipment (not shown) of the service request. Since the first operation normally required upon the detection of a request for service from a line circuit is return of dial tone thereto, the common control or register sender equipment signals the type of service selector 130 connected to the service link network 35 to mark each of the dial tone supervisory devices 60. At the same time, the path check scanner 135 is actuated and scans the supervisory systems in groups with each group containing one of each of the various types of supervisory devices available. Thus, a first scanning signal will be applied to a group consisting of one dial pulse acceptor 40, one ring control 45, one supervisory control 50, one multi-frequency signal detector 55, and one dial tone applicator 60. However, only the dial tone applicators 60 are marked by the type of service selector 130 so that if the dial tone applicator 60 of the first group scanned by the path check scanner 135 is available, only this device will be acquired. If the dial tone applicator 60 in the first group of supervisory systems scanned by the path check scanner 135 is already busy with another call, the scanner 135 will switch to the next group of supervisory devices, this group again containing only a single dial tone applicator 60. The scanning process continues until a group of supervisory devices containing an available dial tone applicator 60 accessible to a free path through the system is marked by the scanner 135 for acquisition or until all of the groups of supervisory systems are scanned without finding an available dial tone applicator. In the latter case, the scanner will begin again with the first group of supervisory systems and continue until an available supervisory system of the type desired is found.

The line circuit requesting service is marked by a negative potential via the line scanner 100 and the required supervisory device, such as the dial tone applicator 60, is acquired by marking this system with ground, which also determines the selected link through the first selector stage SII of the service link network 35 as the link which is connected to the particular supervisory device acquired. In the scanning process performed by the path check scanner 135, a ground mark is applied to each of the supervisory devices only for a sufficient time to permit completion of a current path through all of the stages of the service link network 35 and the line link network 15 to the marked line circuit, but not for so long a time as to permit actual operation of the relays in the mark leads of the various stages of these networks since even the fastest relay of the type in use requires a much longer duration of a pulse for being operated. Upon detection of a complete path from the path check scanner 135 to the marked line circuit by a current detector in the path check scanner, the scanning operation is stopped and ground is applied to the selected supervisory system for a sufficiently long time to operate switching relays in the selected supervisory device to acquire this system in the path to the marked line circuit. However, only the supervisory device can be seized at this point since the path checkpoint devices provided in each of the supervisory systems prevent the prolonged D-C ground from the scanner from spreading beyond the supervisory device 60 and operating any of the switching relays in the first stage of the service link network. However, the means in the path checkpoint devices for preventing a prolonged D-C ground from advancing will permit the initial switch-on transient check pulse to pass through the various stages of the service link network and line link network provided a path is free to the marked line circuit. The decision concerning the path beyond the selected supervisory device must be made subsequently by means of a separate scanner associated with the second stage of the service link network 35, as will be described in greater detail hereinafter.

Upon acquisition of a supervisory device, such as a dial tone applicator 60, a suitable relay therein actuates one of the scanner sections 140 or 150 associated with the portion of the selector stage SII to which the dial tone applicator 60 is connected. If, for example, the scanner 150 is associated with the end portion of the selector stage SII forming a separate group of matrices to which the dial tone applicator 60 is connected, only the lines connected to the path checkpoints 171 through 178 will be scanned via the outputs 151 through 158 of the scanner 150. The scanner 140 will remain idle and thus the path finding operation beyond the selector stage SII will be confined only to those lines which are capable of connection to the selected supervisory system.

The scanner 150 will provide a transient ground or check pulse sequentially on the lines 151 through 158 which will spread through selected links in the selector stage SI of the service link network 35, the junctors 120 associated therewith, and all of the stages of the line link network 15 providing a path therefrom to the marked line circuit. As soon as a completed circuit from the scanner through the remaining stages of the service link network and the stages of the line link network is detected by a current detector in the scanner, the scanner is stopped and a prolonged D-C ground is applied back through the selector stage SII of the service link network 35 to the selected supervisory system. The switching relay in the selector stage is actuated by this prolonged ground signal and a holding ground is forwarded from the associated supervisory device to hold the link in the selector stage during the remainder of the path finding operation.

At the same time, the prolonged D-C ground is applied to the path checkpoint device connected to the selected line extending forwardly to the selector stage SI. Actuation of this path checkpoint device operates the appropriate scanner section 180 or 190 associated with the switching group of the selector stage SI available to the path containing the path checkpoint device operated by the prolonged D-C ground. The other non-selected scanner sections remain idle so that only the paths available from the selected link in the first selector stage SII are scanned. The path checkpoint device also provides means for preventing the prolonged D-C ground from extending into the selector stage SI where it might operate one or several switching relays improperly.

The scanner section connected at the outputs of the appropriate portion of the selector stage SI scans each of the lines connected thereto by applying a transient ground signal forward to the marked line circuit through the line link network. The forward pulse from this point travels through a junctor, if it is free, and, for example, the three stages of the line link network to the marked line circuit, if a complete path is available. Scanning is continued until such a free path is available, at which time, this condition is detected by the current detector in the scanner, which stops the scanner, applying a prolonged D-C ground to the selected path. The prolonged D-C ground extends forward through the available junctor in each of the stages of the line link network operating appropriate switching relays therein, and is extended backwards through the appropriate link of the selector stage SI of the service link network 35 to operate the switching relay therein. The holding ground from the selected supervisory system applied through the selector stage SII is then extended through the next selector stage SI, the junctor in the selected path, and the three stages of the line link network to the marked line circuit to hold each of the switching relays. A single unique path extending from the supervisory system, for example, a dial tone applicator 60, through the stages of the service line network, an available junctor 120, and the stages of the line link network 15 to the line circuit requesting service is established. In the case of a dial tone applicator, dial tone is applied to the line circuit indicating that the subscriber may commence dialing.

Additional supervisory devices are connected to the marked line circuit, such as a dial pulse acceptor 40 or multi-frequency detector 55 in the same manner as indicated above in connection with the association of a dial tone applicator 60 to the line circuit, for purposes of receiving dialed or tone information and determining whether the call is to be extended to a local terminating line circuit or is to be connected to an outgoing trunk circuit. For example, as soon as the first dialing impulse or multi-frequency dialing signal is detected in the junctor, as set forth in the above identified applications of James Gordon Pearce et al., a dial pulse acceptor 40 or multi-frequency signal detector 55 will be connected to the line circuit through the service link network for receiving dialing impulses or multi-frequency dialing signals, respectively, thereby determining the destination of the call, the register sender equipment effects a marking of the terminating line circuit or outgoing trunk circuit and path finding through the trunk link network commences in accordance with the following description in connection with FIG. 3.

With a junctor 120 having been selected and connected through the line link network 15 to the line circuit requesting service during the initial path finding operation, the junctor 120 is marked with ground and the terminating line circuit, for example, is marked with a negative potential in any conventional manner by the common control or register sender equipment. A suitable signal on the mark lead from the junctor actuates one of the scanner sections 201, 202, 203 or 204, associated with that portion of the multiple path switch 200 which is accessible from the particular junctor circuit involved. The output lines from this portion of the multiple path switch 200 are scanned by transient ground pulses in a successive manner with the pulses extending forward through the subsequent stages of the trunk link network and through the stages of the line link network 15 to the marked terminating line circuit (where the call does not involve an outgoing trunk call). When the current detector in the scanner detects completion of the circuit through all of the stages to the marked terminating line circuit, which complete circuit may involve many parallel paths, scanning is stopped and a prolonged DC ground is applied to the selected link of stage 200 from which at least one free path extends through the marked line circuit. The prolonged DC ground actuates the switching relay connecting the link in the multiple path switch 200 with the junctor 120 shown in FIG. 2. The prolonged DC ground is also applied forward to a path check point device of the group of such devices 205 through 212 associated with the line in question, to actuate one of the scanners 216, 217, 218 or 219, at the output of the second stage local or trunk selector 215 for purposes of initiating scanning of only those lines available from the link held in the multiple path switch 200. A transient DC ground is selectively applied to each of the lines connected to the scanner and this ground is extended forward through the multiple path switch stage 225 and group selector stage 231 to the line link network 15, and through the stages of the line link network to the marked terminating line circuit.

As soon as a current is detected by the current detector in the scanner section indicating that a path is available, the scanning is stopped and a prolonged DC ground is applied back through the local or trunk selector 215 to operate the switching relay in the link associated with the selected line, which link then forms an extension of the path from the selected link in the multiple path switch 200, which path is held by a holding ground on the sleeve lead from the junctor circuit. The prolonged DC ground is also applied forward to one of the path checkpoint devices 220 through 223, which initiates operation of one of the scanner sections 226, 227, 228 or 229 associated with that portion of the multiple path switch 225 available from the selected link in the local or trunk selector 215. The scanner scans the lines to the input of group selector 231 through to the line link network 15 and the marked terminating line circuit until a complete path is detected by the current detector in the scanner. Once again, the scanner is stopped upon detection of a completed path, which may be composed of a plurality of parallel free paths, and a prolonged DC ground is applied back through the multiple path switch 225 to operate the relay in the link associated with the selected line and also to operate the relay in the group selector stage 231 and each of the stages of the line link network 15 to the marked terminating line circuit. At this point a complete path is established from the selected junctor circuit 120 through each of the stages of the trunk link network 25 and back through the stages of the line link network 15 to the terminating line circuit. Subsequent operations toward completion of a communication connection between the originating and terminating line circuits, which may involve the association of ring control 45 or other supervisory device to these line circuits through the associated junctor 120, are effected utilizing the same path finding principles set forth above.

If an originating line circuit is to be connected through to an outgoing trunk circuit rather than to a local terminating line circuit, all trunks of the group leading to the desired distant exchange, such as trunk circuits 236 through 239, will be marked by a trunk marker (not shown) similar to the line scanner 100, and the path finding operation from a junctor through the first stage multiple path switch 200 and second stage local or trunk selector switch 215 will be carried out as indicated above. However, instead of scanning forward from the scanner sections 216, 217, 218 and 219, to the third stage multiple path switch 225, the transient DC ground will extend forward sequentially to all available trunk circuits of the marked group. As soon as a current is detected, the scanning is stopped and a prolonged DC ground is applied back through the local or trunk selector 215 to operate the switching relay in the link associated with the selected trunk circuit. The prolonged DC ground is also applied forward and seizes the trunk circuit on which the scanner has stopped. At the distant exchange, the trunk scanner (not shown) associated with the incoming trunk circuits continually scans these circuits to detect an incoming request for service.

A completed connection through a trunk circuit to a distant exchange will ordinarily occur at the time of dialing of the first three digits of the directory number of the terminating line circuit with the remaining four digits providing subscriber identity. Thus, upon detecton of a request for service by the trunk scanner with respect to a given trunk circuit, it is imperative that a dial pulse acceptor 40 or multi-frequency detector 55 be immediately associated with the trunk circuit prior to receipt of the fourth dialed impulse or multi-frequency dialed signal so that dialed information is not lost by the system. A path from an available dial pulse acceptor 40 or multi-frequency signal detector 55 is established under control of a type of service selector 230, responsive to the common control or register sender equipment, in combination with the path check scanner 235, in the same manner as indicated above in connection with the service linke network associated with the originating line circuits. As soon as the fully dialed information is received by the system the terminating line circuit is marked completing the end-to-end marking from the incoming trunk circuit to the terminating line circuit. The path finding operation in accordance with the present invention is then completed from the trunk circuit through the various stages of the trunk link network to the line link network 15 and therethrough to the terminating line circuit in the same manner as indicated above in connection with local terminating calls.

In order to provide greater availability of the paths in the trunk link network 25, the present invention incorporates therein a re-entry from the second stage local or trunk selector 215 to the input of the first stage multiple path switch 200. The first stage multiple path switch 200 of the trunk link network 25 consists of a plurality of switching groups each of which connect to certain ones but not all of the lines in the plurality of groups which form the local or trunk selector 215 in the second stage of the trunk link network 25. Thus, from the lines of a single group in the multiple path switch 200 access is available to the lines in certain of the groups of the local or trunk selector 215, but not to all or even a majority of the groups provided in this second stage. The same is true with respect to the third stage multiple path switch 225. The lines from a single group in the local or trunk selector 215 will connect to the lines in selected ones of the groups in the multiple path switch 225; however, the lines of any one group in the second stage of the trunk link network will not connect to all or even a majority of the groups in the third stage of the network. As a result, if having selected a link, for example, in the multiple path switch 200, one is unable to find a complete path from the links in the local or trunk selector 215 associated with the selected link in the multiple path switch 200 to the marked terminating line circuit, a blocking condition exists. With such a blocking condition, the call cannot be completed since a path cannot be established from the selected link in the first stage of the trunk link network through any of the links available thereto in the second stage of the trunk link network.

In order to prevent such a blocking condition, re-entry circuits 232 and 233 are provided from the second stage local or trunk selector 215 back to the input of the multiple path switch 200. Having selected a link in the multiple path switch 200 belonging to a particular group therein, if the selected scanner section 216, 217, 218 or 219 is unable to find a free path from the local or trunk selector 215 to the marked terminating line circuit, the scanner, after repeated searching of the direct lines, automatically connects the path through one of the many re-entry circuits, for example, one of the re-entry circuits 232 or 233, back to the input of the multiple switch 200 to a group of links therein other than the group with which the original selected link therein is associated. This group of links is then scanned by one of the scanner sections 201, 202, 203 or 204, until an available path through the local or trunk selector 215 in the remaining stages of the trunk link network 25 and the stages of the line link network 15 to the terminating line circuit is determined. The advantage of proceeding through a different group in the first stage multiple path switch 200 via the re-entry circuit is that a whole new group of links in the remaining stages of the trunk link network are made available to the path which would otherwise be confined to a small number of links associated with the single first selected link in the first stage. If the paths associated with that first selected link are all occupied, a blocking condition would result if the re-entry into the other groups of the first stage multiple path switch 200 were not available.

If a blocking condition results after re-entry into another group of the first stage multiple path switch 200, then another re-entry is effected into still another group of the first stage until a path through to the marked terminating line circuit is detected. In accordance with the present invention, as will be indicated more specifically hereinafter, means is provided for effecting repeated re-entries only as a result of blocking conditions during the previous re-entry and combines this with an inhibiting of the previous re-entry to prevent a series of continuous re-entries resulting in a "ring-around-the-rosey" condition.

More specific details of the present invention as described and illustrated in connection with FIGS. 2 and 3 will now be described in connection with FIGS. 4 through 12, arranged as indicated in FIG. 15.

THE SERVICE LINK NETWORK

A more detailed circuit arrangement of the service link network 35, connected between the selected supervisory devices 40 through 60 and a plurality of junctor circuits 120, is illustrated in FIGS. 4, 5 and 6. As already indicated, a plurality of the various types of supervisory devices are available for connection through a junctor 120 to an originating and/or terminating line circuit through the line link network. In FIG. 4, each of the various types of supervisory devices is illustrated, with two dial pulse acceptors 40 and two ring controls 45 being illustrated to indicate the provision of the devices in number. Each of the supervisory devices includes specific circuitry relating to the path finding function in accordance with the present invention, such circuitry being illustrated in detail in connection with one of the dial pulse acceptors 40 in the figure. It should be understood, while not specifically illustrated, that the circuitry associated with the dial pulse acceptor 40 is included in each of the supervisory devices provided. Since the path finding circuitry is similar in each of the supervisory systems, the following description will be concerned specifically with the connection of dial pulse acceptor 40, showing the detailed circuitry of the invention, through the two stages of the service link network 35 to an available junctor 120.

The particular type of supervisory system required for connection to a transmission circuit for providing supervisory control is determined by the register sender or common control equipment in accordance with the line conditions and the sequence of events which has occurred. This selection of a supervisory system is performed by the type of service selector 130, which may consist of a plurality of relays, for example, relays A through E, equal in number to the different types of supervisory devices available for association with the transmission circuit. Each of these relays A through E is provided with a winding (not shown) connected at one end to negative D-C potential so that a ground mark to the free control end of a selected relay winding will actuate the relay. The contacts of the relays A through E are connected in respective lines 401 through 405, which are all connected at one end to ground and are each connected to a respective group of supervisory devices. For example, in the illustrated embodiment in FIG. 4, the line 401 is connected to each of the dial pulse acceptors 40, the line 402 is connected to each of the ring controls 45, the line 403 is connected to each of the supervisory controls 50, the line 404 is connected to each of the multi-frequency signal detectors 55, and the line 405 is connected to each of the dial tone applicators 60. A line 406 is also provided in connection with all of the supervisory devices and serves to provide ground potential back to the type of service selector circuit to reset this circuit once a supervisory device has been acquired.

The selection of an available one of the particular type of supervisory device selected by the type of service selector 130 is performed by the path check scanner 135. This path check scanner 135 will be described in detail in connection with FIG. 12 hereinafter; however, the basic function of this circuit is to apply sequentially to a plurality of output lines 1 through $n$, a transient ground mark sufficient to extend through a supervisory device of the type required and all of the stages of the service link network and the line link network along all links which are not already occupied and which form a complete path to the marked line circuit without actually actuating any of the switching relays in the various stages of these networks. The output lines 1 through $n$ from the path check scanner are connected respectively to one of each type of supervisory device provided. For example, while not specifically illustrated in FIG. 4, line 1 is connected to one dial tone applicator 40, one ring control 45, one supervisory control 50, one multi-frequency signal detector 55 and one dial tone applicator 60. The connection of the various systems to the lines may be provided on a random basis, as indicated in FIG. 4, where the dial pulse acceptor and the dial tone applicator of the first group of supervisory devices is connected to line 1 which is also connected to a ring control from the second group of supervisory devices, and so forth. A line 400 is also provided in connection with all of the supervisory devices for applying a ground mark back to the path check scanner to effect a start and stop operation.

It should be apparent from the description at this point that the coordinate effect of the type of service selector 130 and the path check scanner 135 will be capable of selecting one available supervisory device of the type required. This is apparent since the type of service selector 130 marks only the particular type of supervisory device required while the path check scanner scans the supervisory devices in groups containing only one of any particular type of supervisory device. Thus, for example, with one of the dial pulse acceptors marked from the type of service selector 130, a mark applied to any single output of the path check scanner 135 can acquire only one dial pulse acceptor. Since the other types of supervisory devices are not marked by the type of service selector, these other types of devices will not be acquired when a mark is applied thereto from the path check scanner 135. Thus, acquisition will result only upon coordinate marking form both the type of service selector 130 and the path check scanner 135.

Looking more closely to the path finding circuitry included within the dial pulse acceptor 40 in FIG. 4, a busy-free relay BF is connected between line 401 from the type of service selector and negative D-C potential via contacts of relay SL1 and will be operated by completion of the circuit thereof to ground by actuation of the A relay in the type of service selector 130, provided the normally closed contacts of a relay SL1 are closed indicating that the supervisory system has not already been acquired for connection to a transmission circuit. Contacts of the relay BF serve to connect ground potential via line 409 to the start-stop line 400 of the path check scanner 135 and also serve to connect the MK lead through the device to an appropriate output line 1 from the path check scanner 135 or a standby scanner (not shown) via line 412. Isolation capacitors 407 and 408 in series with diodes 410 and 411, respectively, connect the mark lead MK and line 412 in the supervisory device to the primary path check scanner 135 and to the standby scanner, respectively, and serve to pass a transient ground signal used for path finding while preventing passage of a prolonged D-C ground to subsequent stages. In the case of malfunction of the primary path check scanner 135, the register sender or common control equipment actuates the standby scanner to insure that the requested service will be provided.

A relay CNA is connected between negative potential and the mark lead MK between capacitor 407 and diode 410 and a second relay CNB is connected to the lead 412 between capacitor 408 and diode 411. The relays CNA and CNB are operated selectively by a prolonged D-C ground from the path check scanner 135 or the standby scanner, respectively, and serve to control the actuation of the relay CN. The relay CN in turn provides contacts in series with a relay SL1 which not only indicates the busy condition of the supervisory system by opening the line to the busy-free relay BF, but also serves to enable the switching relay SL2 in the sleeve lead S to the selector stage SII of the network.

While in actuality four lines T, R, S and MK are associated with each transmission circuit and are provided from each supervisory system through the stages of the service link network, a junctor 120, and the stages of the line link network 15 to the marked line circuit, only the lines S and MK are illustrated, since only these lines are associated with the supervisory control provided by the present invention. The selector stage SII of the service link network is illustrated in FIG. 5 as consisting of a plurality of switching matrices which may, for example, be four in number, with only the first matrix 510 and the fourth matrix 540 being illustrated. While it should be understood in connection with the various stages of the service link network, line link network and trunk link network that the specific trunking arrangement between the various stages as to number of links provided and the manner of interconnection therethrough does not form a specific part of the present invention, and so, the specific trunking details illustrated in the drawings herein are offered only by way of example. Certainly, changes in the number of switching matrices at each selector stage of a network or changes in the number of inputs or outputs provided in each switch matrix may be changed without departing from the spirit and scope of the present invention or without loss of advantage. Thus, while each of the switch matrices 510 through 540 forming the selector stage SII in the service link network may, for example, be provided with 12 input lines and 8 output lines, the path finding arrangement in accordance with the present invention is equally applicable to any other combination.

Within each switch matrix in the service link network each of the pairs of lines S and MK are provided with a matrix relay GD having one winding connected in series with the MK lead and a second winding connected between negative potential and the sleeve lead S. The contacts of the matrix relay GD are provided in the sleeve lead S on either side of the point of connection of the second winding connected to negative potential. Connected in series with the primary winding matrix relay GD in the MK lead is a choke coil 550 and a diode 551. The choke 550 provided in series with the matrix relay GD adds to the impedance of the relay so as to prevent a false impulse signal from developing in a backward direction, as will be indicated more clearly hereinafter in connection with the description of the operation. However, the increased impedance provided by the chokes 550 also inhibits the forward transient ground pulse from the scanner, and therefore, a check pulse by-pass around the switching relays and chokes is provided by means of diodes 552.

The path to the input of the selector stage SII of the service link network is determined by the supervisory device selected by the path check scanner 135 in conjunction with the type of service selector 130. However, since a great number of parallel paths from this particular line to the marked line circuit exist in the service link network, a second scanning operation from the outputs of the switch matrix associated with the selected input through the remaining stages of the service link network, junctor 120, and the stages in the service link network may, for example, be provided with 12 input lines and 8 output lines, the path finding arrangement in accordance with the present invention is equally applicable to any other combination.

Within each switch matrix in the service link network each of the pairs of lines S and MK are provided with a guard relay GD having one winding connected in series with the MK lead and a second winding connected between negative potential and the sleeve lead S. The contacts of the guard relay GD are provided in the sleeve lead S on either side of the point of connection of the second winding connected to negative potential. Connected in series with the primary winding guard relay GD in the MK lead is a choke coil 550 and a diode 551. The choke 550 provided in series with the guard relay GD adds to the impedance of the relay so as to prevent a false impulse signal from developing in a backward direction, as will be indicated more clearly hereinafter in connection with the description of the operation. However, the increased impedance provided by the chokes 550 also inhibits the forward transient ground pulse from the scanner, and therefore, a check pulse by-pass around the switching relays and chokes is provided by means of diodes 552.

The path to the input of the selector stage SII of the service link network is determined by the supervisory device selected by the path check scanner 135 in conjunction with the type of service selector 130. However, since a great number of parallel paths from this particular line to the marked line circuit exist in the service link network, a second scanning operation from the outputs of the switch matrix associated with the selected input through the remaining stages of the service link network, junctor 120, and the stages of the line link network 15 to the marked line circuit must be performed. However, because a given input to a switch matrix in the selector stage SII cannot connect to the outputs of the other switch matrices, a scanning of these outputs is unnecessary. Thus, with the assumption that the dial pulse acceptor 40 illustrated in detail in FIG. 5 is selected for connection to the marked line circuit the first mark lead MK to the first switch matrix 510 in the selector stage is determined as the first part of the path, so that only the outputs from this stage 510 can be connected to the selected dial pulse acceptor 40. Thus, in accordance with the present invention the subsequent scanning operation is simplified by restricting scanning only to the pertinent switch matrix, in the case of the example, switch matrix 510, and such selection is carried out by the group selector 565. The group selector 565 consists of a selector relay 558 through 561 for each respective switch matrix in the switching stage SII. Thus, the relay 561 is associated with the first switch matrix 510 and the relay 558 is associated with the last switch matrix 540. The relays 559 and 560 are associated with the intermediate switch matrices (not shown) in an identical manner.

The selection of a supervsiory device by the path check scanner 135 and two of service selector 130 will result in the actuation of one of the relays 558 through 561 associated with the switch matrix to which the selected supervisory device is connected. Actuation of the relay 561, for example, will effect application of a ground mark to a start-stop line 563 to the path check scanner 570 illustrated in detail in FIG. 12, which scanner, identical to the path check scanner 135, will begin to systematically scan a plurality of output lines, which in the exemplified embodiment will be eight in number, equal to the number of outputs from each switch group of the selector stage. Each of the eight output lines from the path check scanner provides for scanning of the corresponding mark lead MK in each of the four switching matrices 510 through 540 of the selector stage. Thus, the first line from the path check scanner 570 is responsible for scanning the first mark lead MK in each of the four switching matrices and the eighth output from the path check scanner 570 is responsible for scanning the eighth output in each of the four switching matrices. Thus, each of the outputs from the path check scanner is connected to four lines which extend respectively to the four switching matrices 510 through 540.

In each of the four lines connected to each output from the path check scanner there is provided contacts of a respective relay 558 through 561 associated with the particular switching matrix to which the line extends. Thus, operation of the relay 561 not only initiates the scanning by the path check scanner 570 by marking line 563 but also enables only those lines connected to the outputs of the path check scanner which extend to the first switch matrix 510. In this way, scanning is restricted to the scanning of the eight output lines from the first switch matrix 510 of the selector stage. If, for example, the relay 558 had been actuated by the multi-frequency signal detector 55 in FIG. 4, the actuation of the relay would effect a starting of the path check scanner 570 and would also enable those lines connected to the eight outputs from the path check scanner which extend to the fourth switch matrix 540 in the selector stage.

Connected to each combination sleeve lead S and mark lead MK extending from the outputs of the selector stage SII is a path check point device, such as the devices 161, 168, 171 and 178, associated with four of the outputs from the first switch matrix 510 and last switch matrix 540 of the selector stage. Since, in the exemplified embodiment, there are eight outputs from each switch matrix in the selector stage, there will necessarily be 32 path check point devices connected between the selector stage SII and the next selector stage SI. Each of the path check point devices is identical having the configuration indicated in connection with the device 161. The device provides a diode 508 and capacitor 507 in series with the mark lead MK for preventing passage of a prolonged D-C signal from the path check scanner 570 to the switch matrices in the selector stage SI (FIG. 6). The path check point device also contains a relay A having a first winding connected between negative potential and the mark lead MK and a second winding connected between negative potential through normally closed windings of a relay B and contacts of the relay A itself to the sleeve lead S. The first winding of the relay A is connected to the mark lead MK on the side of the capacitor 507 and rectifier 508 combination connected to the selector stage SII of the service link network and the relay B is provided with a first winding connected between negative potential through contacts of the relay A to the mark lead MK on the side of the capacitor 507 and rectifier 508 combination connected to the selector stage SI of the service link network. The capacitor-rectifier combination thus provides for isolation between the two stages of the service link network with the relays A and B serving to control the successive transfer of the marking potential from one stage to the next.

The path checkpoint devices also provide for a connection of ground through contacts of the A relay to the group selector 665 associated with the selector stage SI of the service link network, illustrated in FIG. 6, for the purpose of initiating the scanning operation in connection with the links associated with this stage. Each of the switching matrices in the selector stage SI are composed of groups of lines similar to those provided in the selector stage SII with the exception that the number of lines provided in accordance with the trunking schedule in each switch matrix and the number of switch matrices in the selector stage are different. In the exemplified embodiment each of the eight outputs from the switch matrices of the selector stage SII are connected to an individual one of eight switch matrices 610 through 680 in the selector stage SI, each of these switch matrices in the latter stage having four input lines switched selectively to one of six output lines. The individual switch matrices provide a matrix relay GD in association with each combination of sleeve lead S and mark lead MK therethrough with a choke 650 and diode 651 connected in series with the mark lead MK. In addition, in order to provide a by-pass around the switching relays and chokes for the transient scanning pulse from the scanner, the diodes 652 are provided in a manner similar to the diodes 552 in the switching stage SII.

The group selector 665 is similar to the group selector 565 in providing eight relays in association with each of the eight switching matrices provided in this stage. For purposes of simplification only the relays 681, 682 and 688, are illustrated with the path checkpoint devices associated with each matrix in the stage SI connected to the corresponding relay 681 through 688 also associated with that stage. Operation of a group selector relay first performs the function of starting the path check scanner 670 to effect a scanning from the output of the selector stage and also actuates the particular line associated with each of the six output lines extending to the six switch matrices in this stage. For example, actuation of the relay 688 will apply ground to the start-stop line 663 to the path check scanner 670 and will also enable the line connected to each of the six output lines (only lines 1 and 6 being shown) which extend to the first switch matrix 610 in the switching stage. In this way, a stepping from one output line to the other by the path check scanner will apply a transient ground pulse only to those output lines from the first switch group 610.

As indicated previously, a unique path exists from each output of the selector stage SI of the service link network through a single junctor and the three stages of the line link network 15 to a marked line circuit. Thus, if a path has been determined, for example, to one of the four inputs of the switch matrix 610, six possible paths exist from the output of this switch matrix to the marked line circuit. A scanning of these outputs will select one of the possible six paths through an available junctor and the line link network 15; the existence of at least one free path out of those six was determined by the action of the path check scanner 570. Once this path is selected, the line circuit is switched through to the dial pulse acceptor 40 without any further scanning. Thus, no further scanning is required beyond the last stage of the service link network.

The path check scanner associated with type of service selection and the selector stages SI and SII in the service link network is provided by way of example in FIG. 12. In the example as shown in FIGS. 11 and 12, relays are used to describe the logic of the scanner. Because of the high speed of scanning, however, an electronic device has to be used in practice. The scanner includes a switchable magnetic core 1225 which in combination with a relay SP forms a current detector for detecting passage of a current impulse along a complete path to the marked line circuit. The scanning is provided by an actuator 1210 which sequentially switches a movable switching member 1215 connected to line 1205 to ground from one output terminal to the next connected to the output lines of the scanner. The operation of the actuator 1210 is controlled by a relay SC whose contacts selectively provide actuating potential for the actuator 1210. In addition, a repeat relay RP is provided for insuring a rescanning by the actuator 1210 should none of the lines connected to the output thereof indicate a complete circuit to the marked line circuit. A pair of relays I and II insure that at the end of a particular scan the switching member 1215 is shifted to the beginning of the cycle rather than retracting in a reverse direction the contacts already scanned. Start and stop of the scanner is effected by way of line 1200 to the control relay for the holding ground HG.

The scanner of FIG. 12 operates in the following manner. The application of ground on the line 1200 from a particular supervisory device or path checkpoint device in a particular stage of the switching network actuates the holding ground relay HG whose contacts are connected in thet line 1205 from ground to the movable contact 1215 of the switching arrangement. Ground on the line 1200 also extends at this time via line 1220 through normally closed contacts of the de-activated relays I and SP through the relay SC to negative potential thereby actuating the SC relay. Actuation of this SC relay closes the contacts thereof in series connection between actuating negative potential and the actuator 1210 thereby beginning a timed scanning by the movable contact 1215. At this point, the relays I, II, SP and RP, are de-activated.

As the movable contact member 1215 switches from one output contact to the next in rapid sequence, transient ground potential is applied to each of the output lines, which transient potential, as indicated above in connection with the service link network, will pass, along a complete path to the marked line circuit. If no complete path is available, the actuator 1210 will effect a timed switching of the member 1215 to the next contact. On the other hand, if a complete path exists from an output contact to the marked line circuit, the completed circuit from negative potential at the line circuit to ground connected to the lead 1205 will result in the passage of a current impulse through the line effecting a switching of the core 1225. This switching of the core 1225 will induce a current impulse in the line 1230 which will actuate the relay SP. The relay SP will then be held via its own closed contacts and the normally closed contacts of de-activated relay I to the holding ground connected to line 1200. With actuation of the relay SP the line 1220 to the SC relay will be opened and the SC relay will be de-energized separating the actuator 1210 from its actuating negative potential, thus de-activating the actuator and stopping further switching of the movable contact 1215. With the contact member 1215 resting for a prolonged time on one output contact, a prolonged ground is applied at the output of the scanner to the circuit path actuating the matrix relay GD or other switching relay member connected thereto, as will be described more fully hereinafter.

If, however, no complete path exists through the selected stage to the marked line circuit at the time that the movable contact reaches the last output line n—1, the actuator will then switch the movable contact member 1215 to a last terminal n thereby applying ground via line 1240 to relay I, energizing this relay. Energization of the relay I will effect a holding of this relay via its own contacts and line 1250 to the line 1200 providing a holding ground and will also serve to connect the relay RP through normally closed contacts of the de-energized relay SP to the holding ground via line 1200. Actuation of the relay RP in combination with the relay I in absence of operation of the relay SP maintains the holding ground on the relay SC so that the actuator 1210 continues stepping the movable contact member 1215 thereby recycling the scanning operation.

The relay II is provided to detect a scanning of the output contacts in the reverse order which would occur if the movable contact member 1215 were to step from the contact n to the contact n—1. Under the circumstances, the relay I will be actuated prior to the shifting of the contact member 1215 to the contact n—1 so that the latter switching operation will provide for actuation of the relay II via the closed contacts of relay I in line 1235. The actuation of the relay II completes a ground path from the scanner to the register sender equipment indicating an "All Paths (Trunks) Busy" (ATB) condition.

The relay HG is a bi-polar relay which is operated in opposite direction upon sequential application of ground thereto. Thus, at the first application of ground thereto the relay HG will close the contacts in the line 1205 to apply ground to the movable switching member 1215. However, at the time, for example, that a supervisory system is acquired the ground applied to the start-stop lead will be temporarily removed through de-activation of the busy-free relay BF and then will be reapplied as the busy-free BF is once again energized with the holding ground on the sleeve lead. The subsequent application of a ground pulse to the line 1200 in the scanner will effect a switching of the relay HG in the opposite direction opening up the line 1205, but the relay SC will remain actuated due to the reapplied ground to the line 1200 so that the actuator 1210 will continue operation once the mark lead is opened by the switching relay in the sleeve lead. The actuator 1210 will continue switching of the movable contact member 1215, but since no ground is now connected to this switching member no effect upon the output circuits will occur. The switching member 1215 will merely be switched through to the end of the sequence and upon reaching the terminal m the actuator 1210 will automatically stop due to failure of the repeat relay RP to operate. The repeat relay RP will not operate since the relay I does not operate due to lack of a ground connection to complete the circuit therethrough. Thus, by providing the holding ground relay HG as a bi-polar relay, the scanner is automatically provided with means for resetting the switching arrangement in preparation for the next scanning operation.

The operation of the service link network as illustrated in FIGS. 4, 5 and 6 will now be presented. Upon application of a signal to one of the relays A through E in the type of service selector 130 from the common control or register sender equipment, all of the supervisory devices of the one type required will be marked via one of the leads 401 through 405. In the example adopted above, assuming that it is desired to connect a dial pulse acceptor to a marked line circuit, the relay A will be actuated from the common control equipment providing a ground mark on the line 401 connected to each of the dial pulse acceptors 40. The ground mark will be applied in operation of the busy-free relay in all of the dial pulse acceptors 40 wherein the relay SL1 is not operated, i.e., in the dial pulse acceptors which are not already acquired for connection to another line circuit. Upon operation of the busy-free relay BF, ground is connected from the dial pulse acceptor to line 400 initiating a start of the path check scanner 135. The scanner will, as indicated in connection with FIG. 12, apply ground sequentially to the lead 1 through n in a timed fashion. The transient ground pulse is sufficiently short to pass the blocking capacitors 407 and 507 in the dial tone applicator 40 and path check point device 161, respectively, and through the choke coils 550 and 650 in the switch matrices, so as to pass, if a free path exists, through an available junctor 120 and the stages of the line link network 15 to the marked line circuit. However, this transient ground pulse is of sufficiently short duration that it will not operate the relays in the dial pulse acceptor or any of the matrix relays GD in the stages of the service link network or line link network. As soon as a complete path is detected by the current detector in the path check scanner 135, the scanner is stopped, as indicated in connection with FIG. 12, and a prolonged ground is applied to the mark lead MK through the closed contacts of the busy-free relay BF and diode 410 to complete the circuit through relay CNA to negative potential. The CNA relay is then operated operating the CN relay by completion of ground therethrough to negative potential and operation of the CN relay connects the relay SL1 to the mark lead MK on the other side of capacitor 407. The capacitor 407 prevents the prolonged D-C ground from passing beyond the dial pulse acceptor 40 and the operation of the relay CN additionally opens the MK line from the relay SL1 back to the capacitor 407. However, since the SL1 relay via the MK lead is not connected to ground, this relay does not operate at this time.

Upon operation of the CN relay, ground is applied via line 415 to the relay 561 in the group selector 565 effecting application of ground to the start-stop lead to the path check scanner 570 initiating operation of this scanner. With operation of the path check scanner 570 a transient ground is applied in sequence to each of the outputs of the switch group 510 until a complete path is detected by the current detector in the path check scanner, whereupon the scanner is stopped and a prolonged D-C ground is applied to the line. This prolonged D-C ground passes back through the choke coil 550, which presents a low impedance in this direction, and diode 551 through the winding of the matrix relay GD in series with the MK lead through the relay SL1 in the dial pulse acceptor 40 to negative potential, operating the relay SL1 and the matrix relay GD. The operation of the matrix relay GD is held via its second winding connected from negative potential to the sleeve lead S. The contacts of the matrix relay on either side of the point of connection of the second winding to the sleeve lead S provide for a complete circuit from negative potential along the sleeve lead back toward the dial pulse acceptor 40. Operation of the relay SL1, which is provided as a slow-operate relay to allow the matrix relay to operate first, closes the contacts in the sleeve lead S in the dial pulse acceptor completing a path from ground through the relay SL2 and the second winding of the matrix relay GD to negative potential, providing for a holding of the sleeve lead from the ground provided in the dial pulse acceptor. Operation of the relay SL2 disconnects the mark lead extending back from the switch group 510 to the dial pulse acceptor effecting a release of the SL1 relay at this time. It should be noted at this time, that while the SL1 relay was operated, which is only a short period of time, the busy-free relay BF is de-actuated so that the ground applied to the path check scanner 135 is interrupted briefly making possible the switching of the holding relay HG therein to provide for an automatic resetting of the scanning circuit. At this point, a path is established from a free dial pulse acceptor 40 along the sleeve lead S through the first switch group 510 of the first selector stage SII of the service link network 35 to the path checkpoint device 161.

The path along the sleeve lead is held open at the path checkpoint device 161 due to the interposition therein of contacts of the relay B in the path checkpoint device. The prolonged holding ground applied from the path check scanner 570 in the rearward direction to the dial pulse acceptor 40 is also applied forward on the mark lead MK to actuate one winding of the relay A in the path check device 161. Operation of the A relay prior to operation of the B relay provides for energiaztion of the second winding of the A relay connected to the sleeve lead S through its own contacts and the normally closed contacts of de-actuated relay B. The prolonged D-C signal applied from the path check scanner 570 however, is blocked by the capacitor 507 in the path checkpoint device 161.

Operation of the A relay in the path checkpoint device 161 effects application of ground via line 515 through the closed contacts of the relay to one of the group selector relays 681 through 688 in the group selector 665 to determine the switching matrix 610 through 680 which is to be scanned in the next stage of the service link network. Since the path checkpoint device 161 is associated with the first input to the switch matrix 610, the ground will be applied to relay 688 whose actuation will apply a ground signal to the start-stop line of the path check scanner 670 initiating operation of this scanner. The actuated relay 688 will also restrict the scanning to the outputs of the switch matrix 610 by closing contacts in the lines connected to the outputs of the path check scanner associated only with the outputs of this switch matrix. Scanning then commences as indicated above in connection with FIG. 12 with the timed application of a transient ground pulse to each of the output lines from the switch matrix 610 in sequential order until the current detector in the path check scanner determines a complete path through an available junctor 120 and the stages of the line link network 15 to the marked line circuit. The scanner 670 is then stopped and a prolonged D-C ground is applied to the mark lead MK in the forward direction to acquire the junctor 120 connected in the selected line and to set the switching relays in each of the stages of the line link network connected in this path.

The prolonged D-C ground is also applied backward along the mark lead MK through the matrix relay GD in the switch matrix 610 and through the diode 651 and choke coil 650 to one winding of the B relay in the path check point device 161. The closed contacts of energized relay A in the line to the winding of the B relay enable actuation of the B relay at this time which closes the contacts inserted in the sleeve lead S. Negative potential is then applied through the second winding of the matrix relay connected to the sleeve lead S back along the sleeve lead and is held by the holding ground provided in the dial pulse acceptor 40. The relay B is held via its second winding connected to the sleeve lead and the normally closed contacts thereof in connection with the winding of the A relay connected to the sleeve lead open to de-energize the latter relay. Ground from the dial pulse acceptor 40 then extends through all the stages of the service link network, through a selected junctor 120, and through all of the stages of the line link network 15 to the marked line circuit providing a complete path from dial pulse acceptor to line circuit. Contacts of the B relay in the mark lead MK also serves as a means for indicating a busy condition through the particular link by opening this lead and holding it open as long as the sleeve lead S forming part of the link is acquired.

While the above description of the operation of the invention in connection with the service link network provided for a complete line along each of the first inputs to the switching stages through the service link network, it is apparent that such has been provided only to facilitate an understanding of the invention, and that obviously other paths through the various stages of the service link network are selected during various path finding operations.

THE LINE LINK NETWORK

FIG. 7 provides a schematic representation of the line link network 15 and its connection to the various line circuits of a line circuit group. While the line link network is illustrated as consisting of three concentrator stages, it is of course obvious that more or less stages of different configuration may be provided without departing from the spirit and scope of the present invention. The various switch matrices provided in the line link network are essentially the same as those provided in the service link network with certain minor changes. In the exemplary embodiment illustrated in FIG. 7 a line scanner 100 is provided for each group of one thousand line circuits for continuously scanning the line circuits to detect requests for service. As soon as a calling line is detected, the scanning action ceases and a signal is forwarded to the common control or register sender equipment for initiating path finding operations attendant to the connection of a supervisory device to the line circuit requesting service. Negative potential provided by the scanner 100 is connected to the mark lead MK of the subject line circuit and the marking potential is additionally applied to line 741 via a rectifier 742 to actuate a relay C. Actuation of the relay C completes ground connection along line 742 to each of the busy-free BF relays in the available junctor circuits connected to the line link network, which busy-free relays BF will close the mark path through each of these available junctors. In those junctors which are already occupied with a call, the line to the busy-free relay will be inhibited as will the mark path MK therethrough.

Of the first group of one thousand line circuits, FIG. 7 illustrates line circuits 701 and 710 of the first set of ten line circuits, line circuits 711 and 720 of the tenth set of ten line circuits, line circuits 721 and 730 of the ninety-first set of line circuits and line circuits 731 and 740 of the hundredth set of line circuits. These line circuits are connected to 100 switch matrices of the first or unit selector stage of the line link network of which the switch matrices 751–1 and 760–1 of the first set of ten switch matrices and switch matrices 751–10 and 760–10 of the tenth set of ten switch matrices are illustrated. In the exemplary embodiment each of the switch matrices in the unit selector stage of the line link network is provided with ten inputs connected to the line circuits and fifteen outputs connected to the inputs of the second or tens selector stage of the network. In accordance with known trunking principles the tens selector stage is provided with ten sets of fifteen switch matrices so that the total number of inputs to the tens stage is equal to the total number of outputs from the units stage. Each of the switch matrices in the tens stage is provided with five outputs which are connected to the inputs of the hundreds stage consisting of fifteen switch matrices each having ten inputs. Thus, the number of inputs to the hundreds stage is equal to the number of outputs from the tens stage, only the number of switch matrices provided in the respetcive stages being different. Thus, the one thousand line circuits connected to the input of the units stage are concentrated to one hundred and fifteen outputs at the output of the hundredths stage. Certain of these outputs from the line link network are provided for originating traffic and are therefore connected through the junctor circuits 120. Other of the outputs from the line link network are available for terminating traffic from local terminations derived from the trunk link network, therefore providing for completion of a communication circuit to a terminating line circuit in the same exchange group.

THE TRUNK LINK NETWORK

Referring now to FIGS. 8, 9 and 10, which together provide a more detailed representation of the trunk link network 25 in accordance with the present invention, the junctor circuits 120 and the incoming trunk circuits are connected to inputs of the first stage multiple path switch 200, which consists of two groups of five switch matrices, with switch matrices 801 and 805 of the first group and switch matrices 806 and 810 of the second group being specifically illustrated. Group selectors 815 and 820 are provided in association with the two groups of switch matrices, respectively, in the first stage multiple path switch 200, the group selectors 815 and 820 being associated with a path check scanner, which is illustrated in detail in FIG. 11 and will be described more particularly in connection therewith hereinafter. By providing group selectors for each of the groups of switch matrices in accordance with the present invention only a single path check scanner is needed, since the several switch matrices in the two groups can be connected in parallel to the single scanner and the group selector can be utilized to effect enabling only of those lines in the switch matrix associated with the incoming marked line. The alternative to this arrangement is to provide a separate scanner for each switch matrix, which is obviously not as efficient.

The group selectors 815 and 820 are provided with relays GR1 through GR5 associated with each of the five switch matrices controlled by the group selector. These relays, which are operated from incoming lines from junctors or incoming trunk circuits perform two basic functions. First of all, energization of a relay in the group selector connects ground to line 825 to provide for start-stop control of the path check scanner. Secondly, energization of the relay actuates those scanning lines connected to the outputs of the path check scanner associated with the particular switch matrix through which the marked line is to be connected, thereby providing for scanning of one select switch matrix to the exclusion of the other switch matrices in the stage. Actuation of a relay in the group selector also serves to connect line 826 from the path check scanner to line 864 which extends to a relay RAR associated with the second stage local or trunk selector 215 (FIG. 9). The path check scanner selectively connects gruond to the line 826 for actuation of the relay RAR during the re-entry function, which ground mark is also applied through a plurality of diodes 830 to the re-entry circuits 833 associated with the second group of switch matrices in the first multiple path switch stage of the trunk line network to enable those re-entry circuits which are not already busy, making possible a re-entry from the output of a switch matrix in the first group of a stage to an input of a matrix in the second group of a previous stage, as will be indicated in greater detail hereinafter. The same arrangement is provided in connection with the group selector 820 wherein the ground mark is applied from the line 826 through a plurality of diodes 831 to each of the re-entry circuits 832 associated with the first group of switch matrices in the first stake multiple path switch of the trunk link network making possible a re-entry from the output of a switch matrix in the second group of switch matrices in the second stage of the network to the input of a switch matrix in the first group of switch matrices of the first stage.

As in the service link network, a path check point device, such as the devices 205 through 212, is connected in each set of transmission lines extending between the first and second stages of the trunk link network. The path checkpoint devices serve to isolate the second stage switches from the prolonged D-C ground applied from the path check scanner in actuation of the selected relay in a switch matrix of the first stage, provides for connection between the two stages once a path has been selected, and also provides for actuation of the path check scanner associated with the second selector stage of the network.

The eighteen outputs from each of the five switch matrices in each of the two groups in the first stage multiple path switch of the network are connected to a corresponding one of five inputs of each of eighteen switch matrices 901 through 918 and 921 through 938 of each of two groups of switch matrices in the second stage local or trunk selector of the network. Each of the two groups of switch matrices in the second stage of the network is provided with a group selector 900 and 920, respectively, to restrict the scanning by the path check scanner, illustrated in FIG. 12, to the output lines of that switch matrix accessible to the selected link in the first stage multiple path switch of the network. Each of the switch matrices in the second stage is provided with eleven outputs with the first ten outputs being connected to inputs of the third stage multiple path switch of the network or to outgoing trunk circuits and the eleventh output being provided as a re-entry output connected through a re-entry circuit to an input of a first stage switch matrix. The re-entry outputs from each of the switch matrices in the second stage are enabled by the relay RAR operated from the path check scanner associated with the group selectors 815 and 820 in the first stage of the network after a first scan of the direct lines through the network without detecting a free path. This enabling in combination with enabling of the various re-entry circuits associated with a particular group of switch matrices in the first stage will provide for a re-entry, as will be indicated in greater detail hereinafter.

Those outputs from the second stage of the network which extend to the third stage for eventual local termination are connected through path checkpoint devices, such as the devices 1011 through 1018, indicated in FIG. 10. The third stage multiple path switch of the network consists of two groups of five switch matrices 1001 through 1005 and 1006 through 1010, in the exemplified embodiment. Each of these switch matrices contains ten inputs each of which is capable of extending to one of eighteen outputs. From the trunking indicated in the exemplary embodiment, it is apparent that the majority of outputs of the second stage switch matrices extend to outgoing trunk circuits with only a minority of these outputs being connected to the inputs of the third stage of the network. This of course is determined by traffic requirements and the size of the exchange, and can be obviously provided in other combinations. One again, the path checkpoint devices serve to isolate the second and third stage switch matrices and also actuate one of the group selectors 1000 or 1020 to start the path check scanner associated with this stage of the network. The path check scanner illustrated in FIG. 12 is the same scanner as associated with the second stage of the network and is the same as provided in the service link network. The fourth or group selector stage of the trunk link network is provided with two groups of eighteen switch matrices, with each switch matrix having five inputs connected to respective outputs of the switch matrices in the third stage of the network. Each of these switch materices in turn provides ten outputs which extend to local terminations via the line link network.

The path check scanner associated with the first stage of the trunk link network, as seen in FIG. 11, is essentially the same as the path check scanners associated with the remaining stages of the trunk link network and with the stages of the service link network with the addition of necessary circuitry for control of the re-entry function. The line 1105 containing the contacts of relay HG extending through the magnetic core 1125 applies ground selectivity to the output lines from the scanner via the movable contact 1115 connected to and switched by actuator 1110. The actuator 1110 is connected to energizing negative potential through contacts of relay SC which is operated via line 1120 by the ground mark applied to the start-stop lead 825. The current detector portion consists of the magnetic core 1125 and the relay SP, which relay detects a switching of the core 1125 via line 1130 and opens the energizing lead 1120 to the relay SC which de-actuates the actuator 1110. The relays I and II connected to the output contact $n-1$ and $n$ via lines 1135 and 1140, respectively, serve to control the repeat operation of the scanner and prevent a scanning of the output contacts in the reverse direction, as indicated in connection with the scanner of FIG. 12.

The repeat operation of the scanner is effected through actuation of the repeat relay RP via a ground mark received on the line 965 controlled by the ring-around-the-rosey relay RAR in the second stage of the network. The operation of the RP relay is effected upon energization of the relay I when the movable contact 1115 reaches the $n$ terminal indicating that the first ten outputs scanned provide no free path to the marked line circuit or trunk circuit. The scanner will then repeat once more before a re-entry is attempted.

The re-entry circuits 832 and 833 are very similar to the path checkpoint devices, as indicated in FIG. 13. The re-entry circuit consists of relays A and B each having individual windings respectively connected to the mark lead MK and sleeve lead S connected thereto. A capacitor 1310 and diode 1315 are provided in the mark lead MK between the connection of the relays A and B to provide for isolation between the re-entry output from the second stage switch matrix of one group and the input to the first stage switch matrix of one group and the input to the first stage switch matrix of another group for the prolonged D-C ground applied from the path check scanner after an additional free link has been found by this route. The re-entry circuit also includes a busy-free relay BF which enables the mark lead MK at the input to the circuit and includes lines PST and INHIBIT completed by the A relay to operate the appropriate relay in the group selector which controls the switch matrix associated with the particular re-entry circuit, and applies an INHIBIT signal to the path check scanner of the other group to operate a re-entry relay RE therein.

The operation of the invention in connection with the trunk link network including the provision of a re-entry function will now be described. Assuming that the system has received dialed impulses or tone signals from the originating line circuit through the service link network to a dial pulse acceptor indicating that the destination of the call is a local terminating line circuit, an appropriate mark will be applied to the mark lead MK at an input to the trunk link network and to the local terminating line circuit, and the path finding arrangement in accordance with the present invention will then proceed to determine a free path through the several stages of the trunk and line link network. For purposes of the description it is assumed that a negative potential mark 849 is applied to the lead 850 at the first stage switch group 801 and that a negative mark is also applied to the local terminating line circuit.

The negative potential mark 849 connected to the line 850 is applied via line 840, directional control diode 841 and line 843 to the group selector relay GR1 in the group selector 815. With completion of the circuit to ground through the relay GR1, the relay is actuated closing ground through line 844 to the start-stop line 825 to the path check scanner, which initiates a timed scanning of the output lines 1 through 18 connected to the outputs of the switch matrices 801 through 805 and 806 through 810 of the first stage of the network. Actuation of the relay GR 1 also closes contacts in those lines connected between the output of the path check scanner and the particular switch matrix which is connected to the line 850 marked by the negative potential mark 849 from the junctor. In this way, the scanning by the path check scanner is confined to the particular switch matrix whose outputs are accesible to the incoming mark line from the junctor. The outputs of the remaining switch matrices are therefore not scanned during this operation.

The transient ground mark applied in succession to each of the output lines of a particular switch matrix, in the case of the example, switch matrix 801, is of sufficiently short duration that it will not operate any of the relays in the mark path MK in the trunk link network or line link network to the marked line circuit, but will be of sufficient length to indicate to the current detector in the scanner that a complete circuit is available. Thus, upon detection of a free path to the marked terminating line circuit within the path check scanner, the scanner is stopped and a prolonged ground is applied to the particular mark lead. This prolonged ground extends back through the link in the switch matrix 801 via directional diode 836 and choke coil 837 to the negative mark 849 actuating the GD relay connected in the mark lead. The prolonged D-C ground is, however, prevented from reaching the second stage of the network by the path checkpoint devices, such as the devices 955 through 962 illustrated in FIG. 9. With the operation of the GD relay in the switch group 801 contacts in the sleeve lead S are closed back to the ground applied to the sleeve lead from the junctor so that the relay GD is held via its secondary holding winding to negative potential.

The prolonged D-C ground applied from the path check scanner forward along the mark lead actuates the A relay in the path checkpoint device associated with the link in the switch matrix 801 of the first stage selected through the scanning operation. In the example described and illustrated herein, the path checkpoint device 955 is acted upon by the prolonged D-C ground. One winding of the A relay is operated via the ground from the mark lead MK and actuation of this winding serves to close contacts of the relay in series with the second winding thereof connected to the sleeve lead S whereby the relay A is held via the ground applied to the sleeve lead from the junctor.

The capacitor 954 prevents or isolates the switch matrix 901 in the second stage of the network from the prolonged D-C ground applied from the path check scanner associated with the first stage of the network.

Operation of the A relay places ground upon the group relay GR1 and the group selector 900 and actuation of the group selector relay places ground upon the start-stop lead 950 to the path check scanner associated with the second stage of the network. Actuation of this scanner serves to initiate timed application of a transient ground pulse to each of the output lines from one of the switch matrices of the stage as determined by the group selector relay which is actuated in the group selector 900 or 920. In the exemplified embodiment, relay GR1 of the group selector 900 is actuated providing for scanning of the outputs of the switch matrix 901.

Assuming that a free path exists from the output of the switch matrix 901 to the marked terminating line circuit, the scanner will be stopped by the current detector therein as it reaches the link associated with this free path and a prolonged D-C ground is applied to the mark lead MK. This D-C ground is directed in a proper direction to pass the choke coil 951 and the diode 952 to the B relay in the path checkpoint device, such as device 955 connected between the first and second stages of the network. With the A relay energized the winding of the B relay connected to the mark path MK will be energized as a path is completed to negative potential also energizing the GD relay in the switch matrix 901. With actuation of the relay B and the relay GD, the sleeve lead is completed from negative potential through the second holding winding of the GD relay back through the path checkpoint device 955 and the first stage switch matrix 801 to the junctor. Actuation of the B relay also prevents futrher access to this path checkpoint device and to the mark path MK connected thereto from the output of the switch group 801. Since an available path exists from one of the first ten outputs of the switch matrix to the marked terminating line circuit, no need exists for initiating a re-entry function; however, if all paths through the switch matrix 901 to the marked terminating line circuit are occupied, re-entry via the eleventh output of the swtich matrix would be initiated. This operation will be described in greater detail hereinafter.

The application of the prolonged D-C ground to the path checkpoint device 1011 connected to the input of the switch matrix 1001 of the third stage of the network effects the energization of relay A therein which applies a ground mark to the group selector relay GR1 in the group selector 1000. The actuation of this group selector relay GR1 applies ground to line 1019 initiating operation of the path check scanner associated with the third stage of the network, as illustrated in FIG. 12, which scanner sequentially applies a transient ground mark to each of the eighteen output lines therefrom. These output lines are connected through actuation of the selected group relay GR1 to the outputs of the switch matrix 1011 to the exclusion of the other switch matrices and scanning is stopped upon detection of a free path from a given output through the fourth or group selector stage of the network and the line link network to the marked terminating line circuit.

Once again, a prolonged D-C ground is applied to the mark path MK rearward through a winding of the GD relay, diode 1040 and choke coil 1039 in the switch matrix 1001 to the B relay in the path checkpoint device 1011. Operation of the B relay and the GD relay through the complete path to negative potential in the path checkpoint device completes the connection of the sleeve lead back through the three stages of the network to the junctor and the application of the prolonged D-C ground forward through the GD relay in the switch group 1021 in the fourth or group selector stage of the network and through the line link network to the terminating line circuit completes the path from the marked junctor through the trunk link network and line link network to the marked terminating line circuit. Since a line from a given output of the third stage of the trunk link network to a marked line circuit is a unique path, the application of a prolonged D-C ground from the path check scanner associated with this third stage of the network will operate all of the GD relays from the last stage of the trunk link network through the three stages of the line link network.

As indicated in connection with the description of the construction and operation of the service link network in accordance with the present invention, while the preceding description of the trunk link network followed a path through the first line of the first switch matrix in each of the stages, it should be understood that in actual practice the path will more often take devious routes through various inputs and outputs of the various stages to complete a path between a marked junctor and the output of the trunk link network, and that the selection of this first path through each of the stages has been made only for purposes of facilitating an understanding of the principles of the invention and to facilitate the illustration of the complicated circuitry embodying the invention.

It should be apparent from the above description of the configuration and operation of the trunk link network that a path which is initiated at the input of one of the switch matrices 801 through 805 of the first group of switch matrices in the first stage of the trunk link network is confined to those switch matrices of the first group in each succeeding stage of the trunk link network unless re-entry is made possible from an output of one of the stages to the input of the second group of switch matrices at one of the preceding stages. For example, continuing with the above mentioned assumption that a negative potential mark 849 is applied to the line 850 at the first input of the switch matrix 801, it is apparent that the path may continue to any one of the eighteen outputs of the switch matrix 801 which are connected only to the switch matrices 901 through 918 of the second stage. Connection between an output of the switch matrix 801 in the first stage and one of the inputs to the switch matrices 921 through 938 in the second stage is not possible since the trunking confines interconnection to the particular group of switch matrices through all stages of the network. In the same manner, an output from one of the switch matrices 901 through 918 in the second stage can be connected only to one of the inputs of the switch matrices 1001 through 1005 in the third stage or to an outgoing trunk circuit, but cannot be connected to any of the switch matrices 1006 through 1010 in the third stage of the network. Thus, without a re-entry function available in the circuit, if all paths at the output of the switch matrices 901 through 918 associated with the originally marked line 850 through the first stage switch matrices 801 through 805 are blocked due to the use of one or more links in each of the paths to the marked line circuit, it will be impossible to complete the call even though available paths to the marked terminating line circuit might be available if the call were proceeding through the second or subsequent group of switch matrices in each of the stages. Without the re-entry function, the blocking situation cannot be eliminated.

THE RE-ENTRY FUNCTION

In accordance with the present invention the outputs from each of the switch matrices of the second stage local or trunk selector in the trunk link network include an eleventh re-entry output which is connected through a re-entry circuit 832 or 833 to the input of a switch matrix in the other group of switch matrices of the first stage of the network. Thus, if the first ten outputs from the switch group 901 do not provide an available path to the marked line circuit, re-entry can be effected via the eleventh output connected to the re-entry circuit 833 via line 980 and 981. This re-entry circuit 833 connects the mark path MK (line 980) and the sleeve lead S (line 981) to an input to the switch matrix 806 forming one of the switch matrices of the second group of switch matrices 806 through 810 in the first stage of the network. From this input of the switch matrix 806 all of the links of the second group of switch matrices in each stage are available for connection through to the marked line circuit even though the path originally started in the first group of switch matrices at the first stage of the network. If the trunk link network contains more than two groups of switch matrices, which in practice will very likely be the case, then re-entry from the output of a switch matrix of the second group of switch matrices 921 through 938 in the second stage of the network to the input of a switch matrix forming a third group of switch matrices in the first stage of the network can be made possible, and so forth. Thus, substantially full availability of the trunk link network is provided rendering the network substantially non-blocking without the necessity of providing additional parallel circuits through the network merely for the purpose of preventing blocking situations.

The re-entry function is carried out in the following manner. As soon as a junctor and a terminating line circuit are marked for connection, the junctor operates one of the group relays GR1 through GR5 via line 850 initiating operation of the path check scanner due to the application of ground via lines 844 and 825 to the scanner. In addition, operation of the group relay connects the scanner to the outputs of the first switch matrix which is accessible from this junctor, for example, switch matrix 801. The scanner will then apply a transient ground mark to each of the output lines of the switch matrix 901 in succession until the current detector therein detects a complete path to the marked line circuit. However, during this initial scanning of the outputs from the switch matrix 801, the re-entry circuits from the eleventh output of each of the switch matrices in the second stage of the network are not enabled since the relay RAR whose contacts are interposed in each of these outputs is not as yet actuated and the busy-free relay BF and each of the re-entry circuits 832 and 833 are not as yet operated so that the mark lead MK therein is interrupted.

In case the first scan cycle of the path check scanner associated with the first stage of the network is unsuccessful in determining a free path to the marked terminating line circuit, the movable switch member 1115 (FIG. 11) will reach the output contact $n$ enabling the I relay thereby permitting an enabling of the repeat relay RP through ground applied via line 965 through closed contacts of the actuated relay RAR. The relay RAR has been actuated along with actuation of the relay I in the scanner completing connection of ground via line 826 and line 864 to the relay. Thus, a preparation for re-entry is effected upon reaching the end of the first scan cycle of the path check scanner including actuation of the repeat relay RP so as to provide a second cycle from the scanner, and actuation of the relay RAR to enable the re-entry outputs from the second stage switch matrices 901 through 918, and enabling of the re-entry circuits 832 and 833 due to the ground mark applied through contacts of the relay RAR and line 965 through diodes 830 to the ERE inputs to each of these re-entry circuits operating the busy-free relay BF therein.

A relay RAR is associated with each group of switch matrices in the second stage of the network and only the RAR relay associated with the group of matrices accessible from the selected junctor is actuated after the first scan cycle of the scanner is concluded. In this way, re-entry is possible only from one group of switch matrices to another group of switch matrices, eliminating the possibility that re-entry may be simultaneously carried on between more than two groups of switch matrices effecting a ring-around-the-rosey situation. For example, if the re-entry circuits at the output of the switch matrices 921 through 938 were enable at the same time, a transient path finding pulse might pass from the switch matrix 801 through the switch matrix 901 to a re-entry circuit connected to the input of switch matrix 806, and then might pass through the switch matrix 921 via a re-entry circuit back to the input of switch matrix 801, from which the cycle may once again be repeated. This undesirable situation is eliminated by provision of a separate RAR relay associated with each group of switch matrices in the second stage of the network, with a select relay RAR being enabled from the particular group selector associated with the group of switch matrices accessible from the selected junctor.

Transient ground pulses applied by the path check scanner to the MK leads connected at the output of the switch matrix 801 during the second cycle of scan are now capable of travelling through the re-entry circuits connected at the output of this switch matrix as well as the direct lines to the marked terminating line circuit. The path from the re-entry circuit to the input of a switch matrix 806 through 810 of the first stage of the network then provides access to additional switch matrices in the second group of switch matrices in each stage of the network. If the current indicator in the path check scanner detects a path from the output of the switch matrix 801, which path may be a direct path or a path via a re-entry circuit, the scanner is stopped and a prolonged ground potential is applied to the MK lead operating the GD relay in the matrix 801 and extends forward to the path checkpoint device connected to this link. The A relay in the path checkpoint device is actuated, as described above, and this relay actuates one of the group relays GR1 through GR18 in the group selector 900 initiating operation of the path check scanner (FIG. 12) via line 950 connecting the scanner to the outputs of the switch matrix, for example, switch matrix 901, connected to the selected link in the first stage of the network. The path check scanner then scans all of the outputs of the switch matrix 901 including the re-entry output in an attempt to find a free path to the marked terminating line circuit. It should be noted at this point that operation of the path check scanner associated with the second stage of the network effects a third scanning of the direct lines to the marked terminating line circuit, the path check scanner associated with the first stage of the network having already scanned these links twice. The third scanning of the direct lines is carried out due to the fact that a direct route may have been released subsequent to the first scan of the path check scanner associated with the first stage of the network which direct route would be preferred to a re-entry route through the network. In addition, unless provision is made to insure that no direct path exists prior to selection of a re-entry path, an undesirable parallel seizure of two links could occur. By providing a re-scanning of these direct routes in the second stage of the network after they have been scanned twice from the first stage prior to seizing of a re-entry outlet, only one of a possible pair of available paths will be seized. In addition, by providing the re-entry path as the last outlet from a switch matrix, if a direct path should become free, it will be seized automatically in preference to the re-entry outlet.

When the path selector into the second stage of the network reaches the re-entry outlet from the switch matrix 901, and presumably detects a free path to the marked terminating line circuit, it stops and activates the GD relay in the matrix 901 and the B relay in the path checkpoint device 956 extending the path from the junctor through the second stage of the network and also applies a prolonged ground potential forward to the re-entry circuit 833 to operate the A relay therein. With actuation of the A relay in the re-entry circuit, the group relay GR1 in the group selector 820 associated with the switch matrices 806 through 810 connects the path check scanner to the outputs of the switch matrix 806 to effect a scanning of the links from the output of this switch matrix. At the same time, actuation of the A relay operates relay RE in the path check scanner via line 827 to prevent a second re-entry circuit from being seized during the second scan cycle of the scanner. Operation of the relay RE, as indicated above, opens the line 826 preventing operation of the relay RAR.

Since the path check associated with the first stage switch matrix 801 indicated an available path through the second group of switch matrices via the re-entry circuit, the only task of the scanner at this time is to find and mark one available path through these matrices to the marked terminating line circuit. When the first available path is detected by the current detector in the scanner, the scanner is stopped and a prolonged ground potential is applied backward to operate the B relay in the re-entry circuit and also the relay GD in the switch matrix 806 as well as the A relay in one of the path checkpoint devices 959 through 962 at the input to the second stage of the network. The path at this point extends from the junctor through switch matrices 801 and 901, and through a re-entry circuit 833 and through a link in the switch matrix 806. Path finding through subsequent matrices in the following stages of the network to the marked terminating line circuit via the line link network follow the normal path finding operations indicated above.

As is apparent from the above description, means are provided in accordance with the present invention for insuring that all possible avenues through the trunk link network from stage to stage through a given group of switch matrices in each stage is explored before the re-entry function is called upon. For example, the path check scanner with appropriate control circuitry effects a complete scanning of the available outputs from a switch group and then rechecks these outputs before the re-entry output is called upon. In this way, it is assured that a connection is completed through a given group of switch matrices in each stage from an input mark if possible before an attempt is made to find a path through the links of a secondary group of switch matrices within the network. Full availability through the network using normally available paths rather than providing additional parallel paths solely for eliminating blocking is then made possible by the present invention.

I have shown and described several embodiments in accordance with the present invention. It is understood that the same is not limited thereto but is susceptible of numerous changes and modifications as known to a person skilled in the art and I, therefore, do not wish to be limited to the details shown and described herein, but intend to cover all such changes and modifications as are encompassed by the scope of the appended claims.

I claim:

1. A path finding system for effecting interconnection of electrical devices through a network of switching matrices comprising
    a multi-stage network of switching matrices having a plurality of inputs and a plurality of outputs, said network providing plural paths between each input and a given output,
    a first electrical device connected to an input of said network,
    scanning means connected in each stage of said network for determining a free path from the respective stage to said first electrical device and for generating a signal for acquiring said free path, and
    path check means connected in each path at each stage of said network from which plural paths extend to said first electrical device for blocking said signal for acquiring a free path generated by the scanning means associated with the preceding stage and for actuating the scanning means associated with its respective stage upon receipt of said signal.

2. The combination defined in claim 1 wherein each stage of said network consists of a plurality of switch matrices, with each input of a matrix being connectable to any of the outputs thereof, said scanning means including stepping means for sequentially applying a mark potential of short duration to the inputs of the matrices forming the stage.

3. The combination defined in claim 2 wherein said scanning means further includes current detecting means for detecting a current on a path extending from said scanning means to said first electrical device as a result of said mark potential, said current detecting means being effective to disable said stepping means resulting in prolonged connection of said ground mark to said path on which said current is detected.

4. The combination defined in claim 3 wherein said current detecting means consists of a switchable magnetic core having first and second magnetic states, said mark potential being connected to a line passing through said core to said stepping means so that the state of said core is switched upon connection of said mark potential to a complete path to said first electrical device.

5. The combination defined in claim 4 wherein said stepping means is constructed to step from one input to the next at a rate such that the duration of said mark potential applied sequentially to the inputs of the matrices is insufficient to acquire any of the paths through said network.

6. The combination defined in claim 2 wherein said scanning means further includes group selector means for enabling connection of said stepping means sequentially to only the inputs of that one matrix of the stage accessible to a previously selected path through a preceding stage.

7. The combination defined in claim 6 wherein said group selector means as well as the stepping means is actuated by a signal applied via the path selected through the preceding stage of the network so that selection of a path through one stage automatically limits scanning in the next stage to the paths therein accessible to the selected path.

8. The combination defined in claim 4 wherein said scanning means includes recycling means responsive to said mark potential at the last output of said stepping means for effecting a recycling thereof upon failure to detect a free path during any complete scan of accessible paths.

9. The combination in claim 8 wherein said scanning means further includes first means for selectively controlling connection of said mark potential to said line passing through said core, and further including means in said second electrical device for actuating said first means to disconnect said mark potential in response to receipt of said signal for acquiring a free path.

10. The combination defined in claim 1 wherein said path check means includes blocking means for preventing passage of a prolonged D-C signal in the form of a capacitor capable of passing a transient D-C signal and a rectifier poled to pass signals forward to the next stage toward said first electrical device.

11. The combination defined in claim 10 wherein said path check means includes second relay means connected to said blocking means on the side connected to the previous stage of the network toward said second electrical device for actuating the scanning means associated with the next stage of the network toward said first electrical device in response to receipt of said signal for acquiring a free path.

12. The combination defined in claim 11 wherein said path check means includes third relay means connected to said blocking means on the side thereof opposite said second relay means responsible to said signal for acquiring a free path derived from the scanning means of the next stage of the network for completing a path from the previous stage to the next stage through said path check means.

13. A path finding system for effecting selection and interconnection of electrical devices through a network of switching matrices comprising a multi-stage network of switching matrices having a plurality of inputs and a plurality of outputs, a first electrical device connected to an input of said network, said network providing plural paths between each input and a given output, a plurality of second electrical supervisory devices, each falling into one of a number of categories and each connected to an individual output of said network, first scanning means having a separate output operatively associated with each of a plurality of groups of second electrical devices, each group consisting of at least two second electrical devices from different ones of said number of categories, for sequentially applying a transient signal to each output thereof, and category selection means having an individual output connected to all second electrical devices of a given category for enabling transfer of transient pulses through devices of only one selected category at a time.

14. The combination defined in claim 13 wherein each of said second electrical devices includes busy-free relay means connected to an output of said first scanning means on a line through said device to an output of said network.

15. The combination defined in claim 14 wherein blocking means is provided in said line in each second electrical device for preventing passage of a prolonged D-C signal.

16. The combination defined in claim 15 further including second scanning means connected in each stage of said network for determining a free path from a respective stage to said first electrical device and for generating a prolonged D-C signal for acquiring said free path.

17. The combination defined in claim 16 wherein said second scanning means includes stepping means for sequentially applying a mark potential to the outputs thereof at a speed resulting in application of a transient signal to each enabled second electrical device.

18. The combination defined in claim 17 wherein said first scanning means includes current detecting means for detection of passage of said transient signal on a free path to said first electrical device, said current detecting means being effective to disable said stepping means resulting in application of a prolonged D-C signal to said free path.

19. The combination defined in claim 18 wherein said second electrical devices each include first relay means responsive to said prolonged D-C signal for initiating operation of the second scanning means operatively associated with the stage of the network with which the second electrical device is associated.

20. The combination defined in claim 19 wherein each stage of said network consists of a plurality of switching matrices, with each matrix input being connectable to any of the outputs thereof, the paths through said matrix each consisting of at least a mark lead and a sleeve lead.

21. The combination defined in claim 20 wherein said first and second scanning means are connected to the mark lead of said paths for applying said transient signals thereto to detect a free path through said matrix.

22. The combination defined in claim 21 wherein said sleeve lead in each second electrical device is connected to ground and each said second electrical device includes second relay means responsive to a prolonged D-C signal from said second scanning means actuated by said first relay means to connect the sleeve lead in said device to the next stage of said network.

23. The combination defined in claim 22, wherein said second relay means includes means effective upon actuation of said second relay means to disable said busy-free relay means thereby preventing connection of said second electrical device to said first scanning means.

24. The combination defined in claim 23 wherein the mark lead in each switching matrix includes a third relay capable of completing the sleeve lead associated therewith through the respective network stage.

25. The combination defined in claim 24 wherein a first blocking means is provided in the mark lead of each switching matrix in series with said third relay for preventing passage of a prolonged D-C signal in the direction through said network from said second electrical device to said first electrical device.

26. The combination defined in claim 25 further including path check means in each path at each stage of said network from which plural paths extend to said first electrical device for blocking said prolonged D-C signal generated by the second scanning means associated with the preceding stage and for actuating the scanning means associated with its respective stage upon receipt of said signal.

27. The combination defined in claim 24 wherein said current detecting means consists of a switchable magnetic core having first and second magnetic states, said mark potential being connected to a line passing through said core to said stepping means so that the state of said core is switched upon connection of said mark potential to said free path.

28. The combination defined in claim 27 wherein said stepping means is constructed to step at a rate faster than the time of operation of said third relay means such that said transient signal is incapable of actuating said third relay means.

29. The combination defined in claim 26 wherein each second scanning means further includes group selector means for connecting the outputs of said scanning means only to the single matrix in each stage accessible to the path selected in the previous stage.

30. The combination defined in claim 29 wherein said group selector means includes a group relay associated with each matrix of the stage, each group relay being effective to connect one output of the outputs from the matrices of the stage accessible to the selected path of the previous stage to a respective output of the scanning means.

31. The combination defined in claim 30 wherein each group relay is connected to a path check means in the previous stage of the network so that selection of a path through one stage automatically limits scanning in the following stage to the paths therein accessible to the selected path.

32. The combination defined in claim 30 wherein each group relay includes means for effecting actuation of said stepping means in the second scanning means.

33. The combination defined in claim 27 wherein said first and second scanning means each include re-cycling means responsive to said mark potential at the last output of said stepping means for effecting a re-cycling thereof.

34. The combination defined in claim 33 wherein said first scanning means further includes fourth relay means responsive to said first relay means for selectively controlling connection of said mark potential to said line passing through said core.

35. The combination defined in claim 34 wherein said second electrical devices include fifth relay means connected in the sleeve lead and actuated upon actuation of said second relay means connecting said sleeve lead to the next network stage, said fifth relay means upon actuation being effective to disable said second relay means.

36. The combination defined in claim 26 wherein said path check means includes blocking means for preventing passage of a prolonged D-C signal on said mark lead, said blocking means being in the form of a capacitor capable of passing a transient signal and a rectifier poled to pass signals forward to the next stage toward said first electrical device.

37. The combination defined in claim 36 wherein said path check means includes sixth relay means connected to said blocking means in said mark lead on the side of said blocking means connected to the previous stage of the network toward said second electrical device for actuating the scanning means associated with the next stage of the network toward said first electrical device in response to a prolonged D-C signal.

38. The combination defined in claim 37 wherein said path check means includes seventh relay means connected to said blocking means on the side thereof opposite said sixth relay means responsive to a prolonged D-C signal on said mark lead from the scanning means in the next stage for completing the sleeve lead connection between the next stage and the previous stage.

39. The combination defined in claim 13 further including an additional multi-stage network of switching matrices connected to said other multi-stage network of switching matrices, and means for effecting inter-connection between certain first electrical devices and other selected first electrical devices or outgoing circuits through said additional multistage network as determined by certain of said second electrical supervisory devices.

40. The combination defined in claim 39 wherein said additional multi-stage network consists of at least two multi-stage groups of switching matrices connected in parallel with the inputs of each group being connectable to only the outputs of the respective group through the stages thereof.

41. The combination defined in claim 40 further including re-entry means for effecting connection from a given stage of one group to a preceding stage of the other group only when no free path completely through said one group from a selected input thereof exists.

42. The combination defined in claim 41 wherein third scanning means is associated with each stage of said additional network for determining a free path from a respective stage to said other selected first electrical devices and outgoing circuits.

43. A path finding system for effecting interconnection of electrical devices through a network of switching matrices comprising
a multi-stage network of switching matrices having a plurality of inputs and a plurality of outputs, said network including at least two multi-stage groups connected in parallel,
a group of first electrical devices each selectively connectable to respective inputs and outputs of said network,
scanning means connected in each stage of said network for determining a free path from the respective stage to a selected first electrical device and for generating a signal for acquiring said free path, and
re-entry means responsive to said scanning means for connecting one stage of one of said multi-stage groups to an input of the other multi-stage group.

44. The combination defined in claim 43 wherein the paths through said network of switching matrices each consist of at least a mark lead and a sleeve lead.

45. The combination defined in claim 44 wherein said scanning means includes stepping means for sequentially applying a mark potential to the output thereof at a speed resulting in application of a transient signal to a path at a respective stage of said network.

46. The combination defined in claim 45 wherein said scanning means further includes current detecting means for detection of passage of said transient signal on a free path to a selected first electrical device, said current detecting means being effective to disable said stepping means resulting in application of a prolonged D.C. signal to said free path.

47. The combination defined in claim 46, further including path check means in each path at each stage of said network from which plural paths extend to said first electrical device for blocking said prolonged D.C. signal generated by the scanning means associated with the preceding stage and for actuating the scanning means associated with its respective stage upon receipt of said signal.

48. The combination defined in claim 47 wherein each scanning means includes group selector means associated with each group of switching matrices for connecting the outputs of said scanning means to the single matrix in the stage accessible to the path selected in the previous stage.

49. The combination defined in claim 48 wherein said scanning means includes re-cycling means responsive to said mark potential at the last output of said stepping means for effecting a re-cycling thereof.

50. The combination defined in claim 49 wherein said re-entry means includes a re-entry output in each switching matrix included in said one stage of said one multi-stage group and a re-entry control device connecting each re-entry output to an input of the other multi-stage group.

51. The combination defined in claim 50 wherein said re-entry means further includes for each group of matrices a ring-around-the-rosey relay having contacts in each re-entry output each actuated via the group selector means by the scanning means of the stage preceding said one stage only after operation of the re-cycling means therein.

52. The combination defined in claim 51 wherein the re-entry outputs are the last outputs of the switching matrices so that all direct paths are scanned prior to scanning of the re-entry paths.

53. The combination defined in claim 52 wherein said re-entry means includes a re-entry relay in said scanning means operated by a re-entry device for preventing further actuation of a ring-around-the-rosey relay.

54. The combination defined in claim 53 wherein said re-entry devices include blocking means for preventing passage of a prolonged D.C. signal while permitting passage of a transient signal.

55. The combination defined in claim 54 wherein said re-entry devices further include enabling relay means responsive to actuation of a ring-around-the-rosey relay for enabling association of re-entry devices of one group of matrices with the re-entry outputs of the other group of matrices.

References Cited
UNITED STATES PATENTS

| | | | |
|---|---|---|---|
| 3,390,236 | 6/1968 | Lawrence | 179—18 |
| 3,349,189 | 10/1967 | Van Bosse | 179—18 |
| 3,184,552 | 5/1965 | Macrander | 179—18 |

KATHLEEN H. CLAFFY, Primary Examiner

T. W. BROWN, Assistant Examiner